(12) United States Patent
Yamazaki

(10) Patent No.: US 7,701,614 B2
(45) Date of Patent: Apr. 20, 2010

(54) IMAGE PROCESSING METHOD, APPARATUS, AND PROGRAM WITH SELECTIVE ERROR DIFFUSION AMONG A PLURAITY OF PIXEL GROUPS WITHING A DIGITAL IMAGE

(75) Inventor: Yoshirou Yamazaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1012 days.

(21) Appl. No.: 11/092,787

(22) Filed: Mar. 30, 2005

(65) Prior Publication Data

US 2005/0237575 A1 Oct. 27, 2005

(30) Foreign Application Priority Data

Mar. 31, 2004 (JP) .............................. 2004-107845

(51) Int. Cl.
*G06K 15/00* (2006.01)
(52) U.S. Cl. ...................... 358/3.03; 358/1.9; 358/3.01; 358/3.21; 358/3.22; 382/251; 382/252; 345/616
(58) Field of Classification Search ....... 358/3.03–3.05, 358/466, 1.9, 448, 534; 382/252, 270, 162, 382/237
See application file for complete search history.

(56) References Cited

U.S. PATENT DOCUMENTS 5,309,254 A * 5/1994 Kuwabara et al. .......... 358/3.21

(Continued)

FOREIGN PATENT DOCUMENTS

JP 7-15606 A 1/1995

(Continued)

OTHER PUBLICATIONS

Fujifilm, "FinePix S5000" Brochure, 2003, Fuji Photo Film Co., Ltd., Ref. No. EB-309E (SK-03-07-DT-MW).*

*Primary Examiner*—Mark K Zimmerman
*Assistant Examiner*—Javier J Ramos
(74) *Attorney, Agent, or Firm*—Birch, Stewart, Kolasch and Birch, LLP

(57) ABSTRACT

The image processing method for performing halftoning of a digital image constituted by an array of pixels having grayscale values which correspond to a content of the digital image, the method comprises the steps of: grouping the pixels constituting the digital image into a first group comprising pixels in pixel positions from which a quantization error generated through quantization is diffused to a peripheral pixel, and a second group comprising pixels in pixel positions from which the quantization error generated through quantization is not diffused to a peripheral pixel; performing a first quantization process on the pixels belonging to the first group using a threshold matrix; determining the quantization error generated during the first quantization process; diffusing the quantization error obtained in the quantization error determining step to at least one non-quantized pixel belonging to the second group which is adjacent to the pixel subjected to the first quantization process; and performing a second quantization process, using a threshold matrix, on the non-quantized pixel to which an error value is diffused during the quantization error diffusing step.

17 Claims, 29 Drawing Sheets

U.S. PATENT DOCUMENTS

| | | | |
|---|---|---|---|
| 5,467,201 A * | 11/1995 | Fan | 358/447 |
| 5,592,592 A * | 1/1997 | Shu | 358/1.9 |
| 5,604,605 A | 2/1997 | Moolenaar | |
| 5,757,976 A * | 5/1998 | Shu | 382/252 |
| 6,172,768 B1 * | 1/2001 | Yamada et al. | 358/1.9 |
| 6,393,150 B1 * | 5/2002 | Lee et al. | 382/256 |
| 6,512,597 B1 * | 1/2003 | Cooper et al. | 358/1.9 |
| 6,851,783 B1 * | 2/2005 | Gupta et al. | 347/15 |
| 2002/0057459 A1 * | 5/2002 | Nagarajan et al. | 358/3.03 |

FOREIGN PATENT DOCUMENTS

| | | |
|---|---|---|
| JP | 2000-177178 A | 6/2000 |
| JP | 2001-157055 A | 6/2001 |
| JP | 2003-110852 A | 4/2003 |

\* cited by examiner

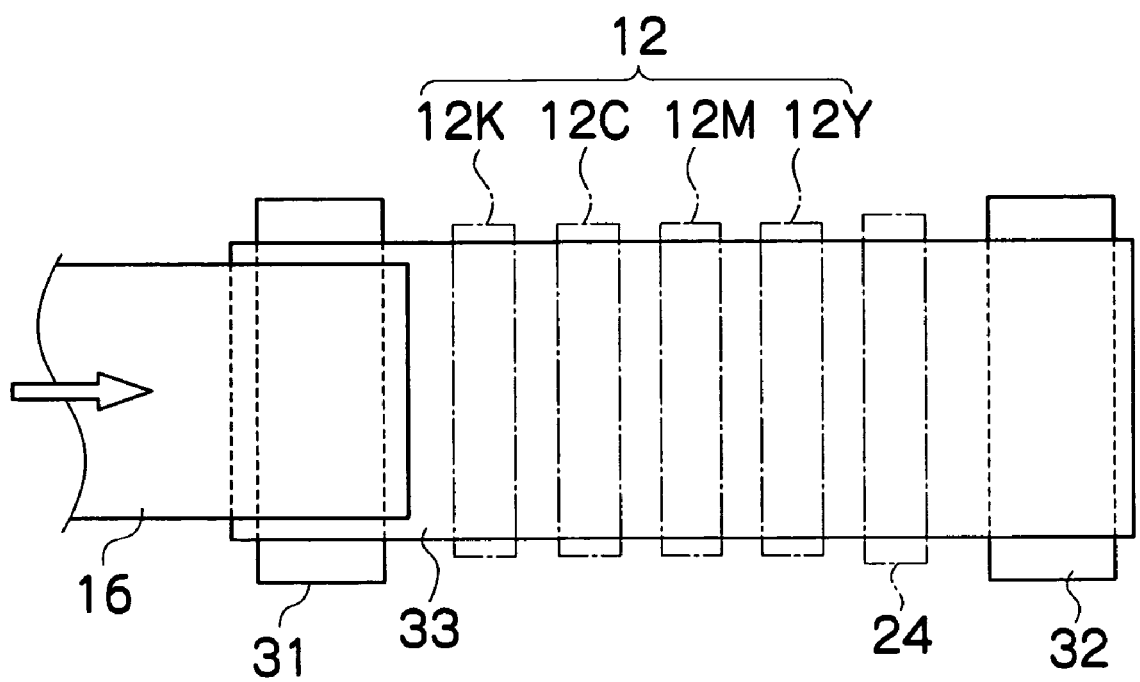

50 (12K, 12C, 12M, 12Y)

51 52 54
53

51 52 54
53

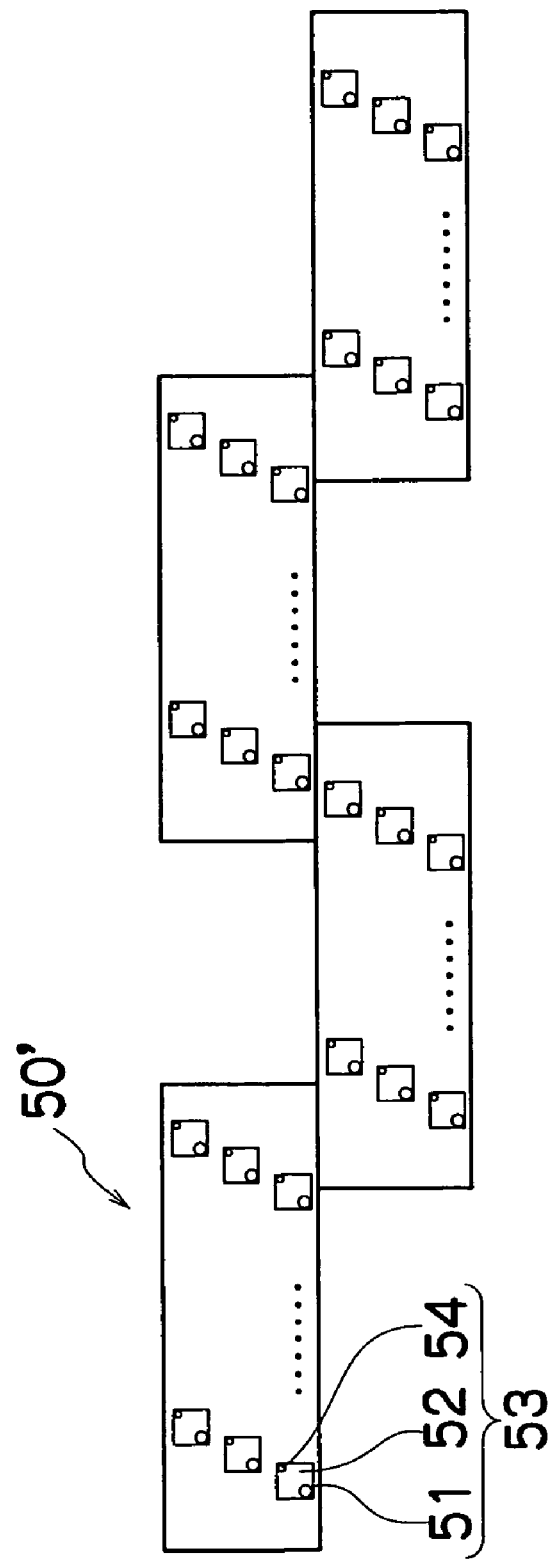

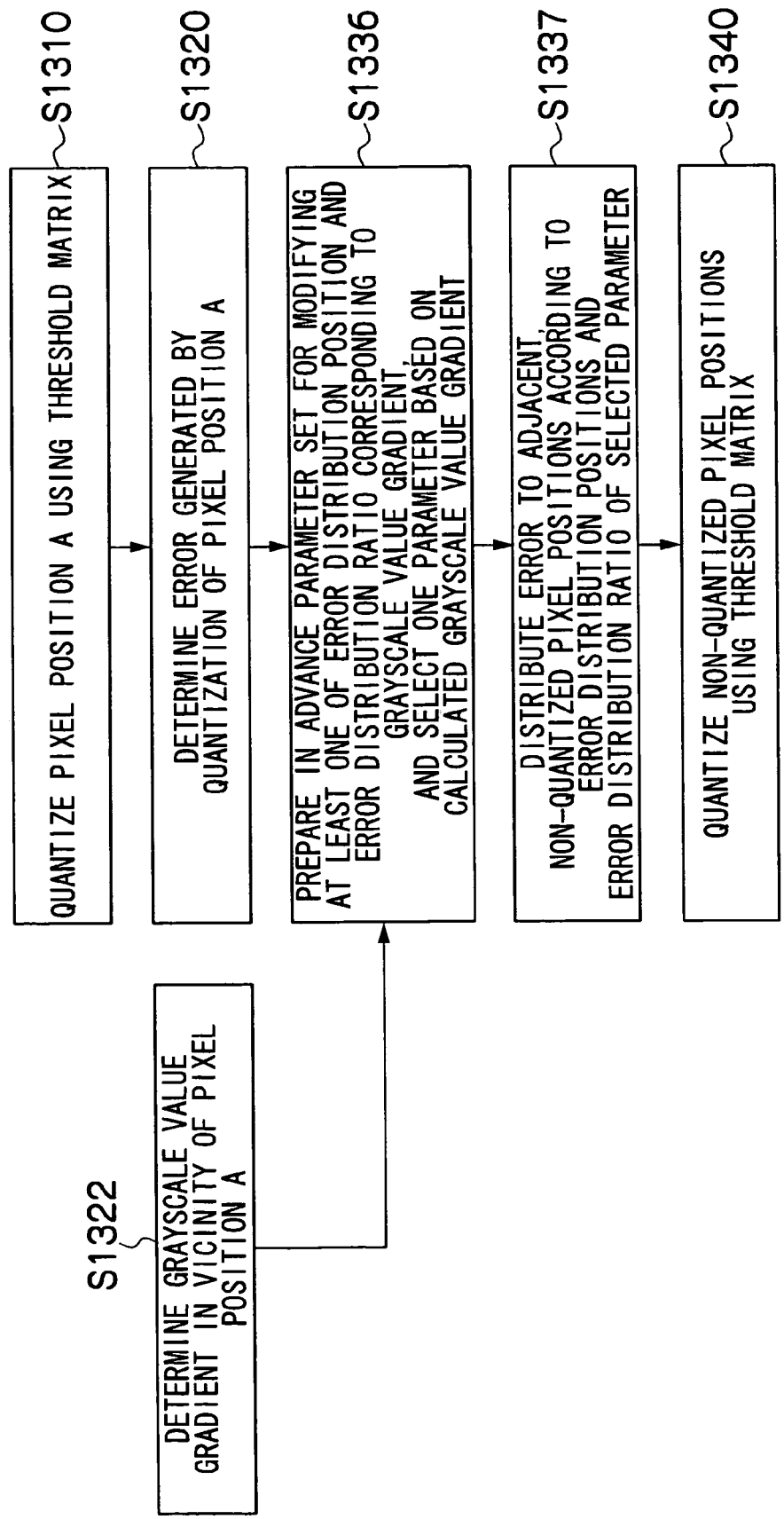

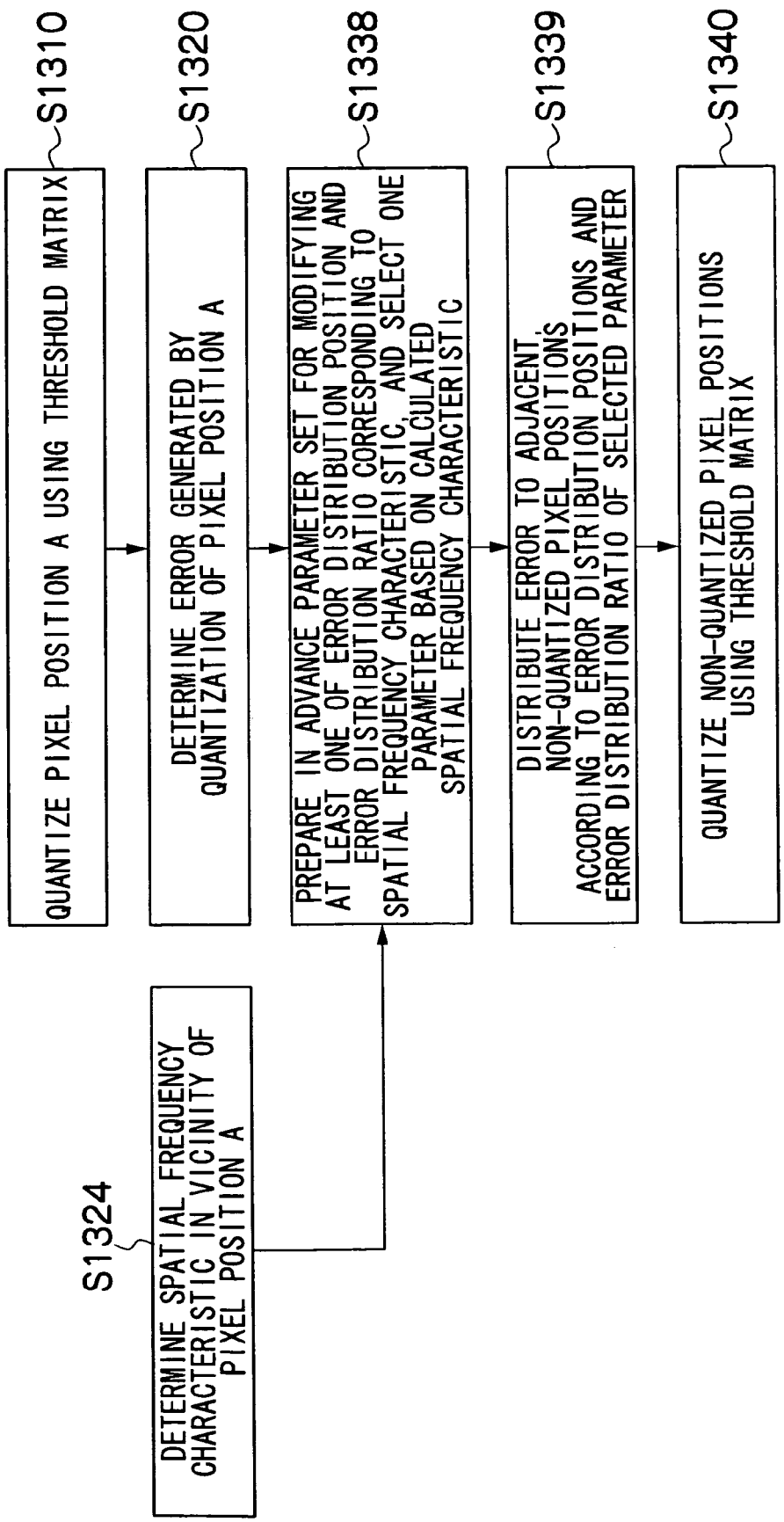

RADIALLY AVERAGE

RADIAL FREQUENCY $f_r$

R. A. P. S.
(RADIALLY AVERAGED POWER SPECTRUM)

RADIAL FREQUENCY $f_r$

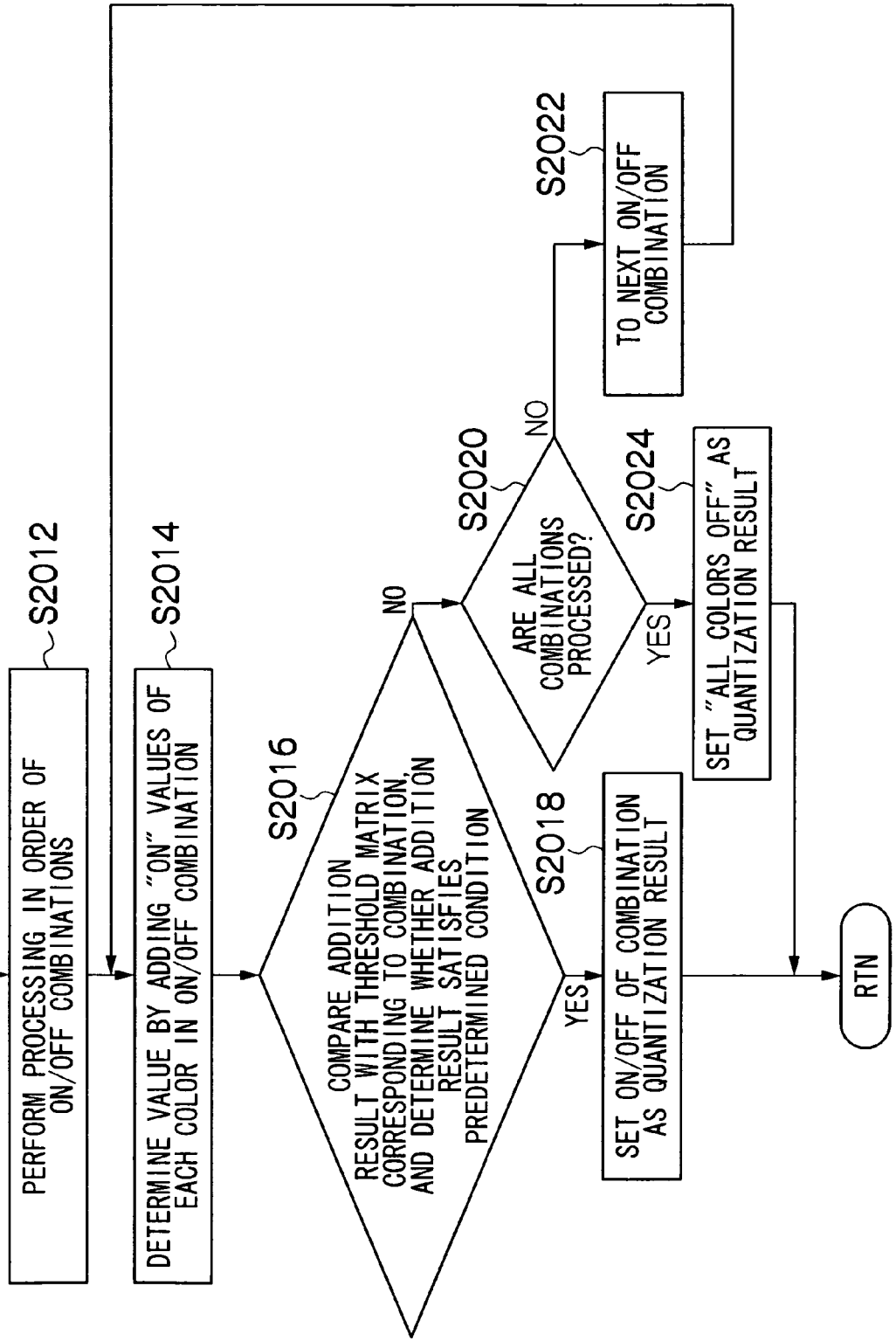

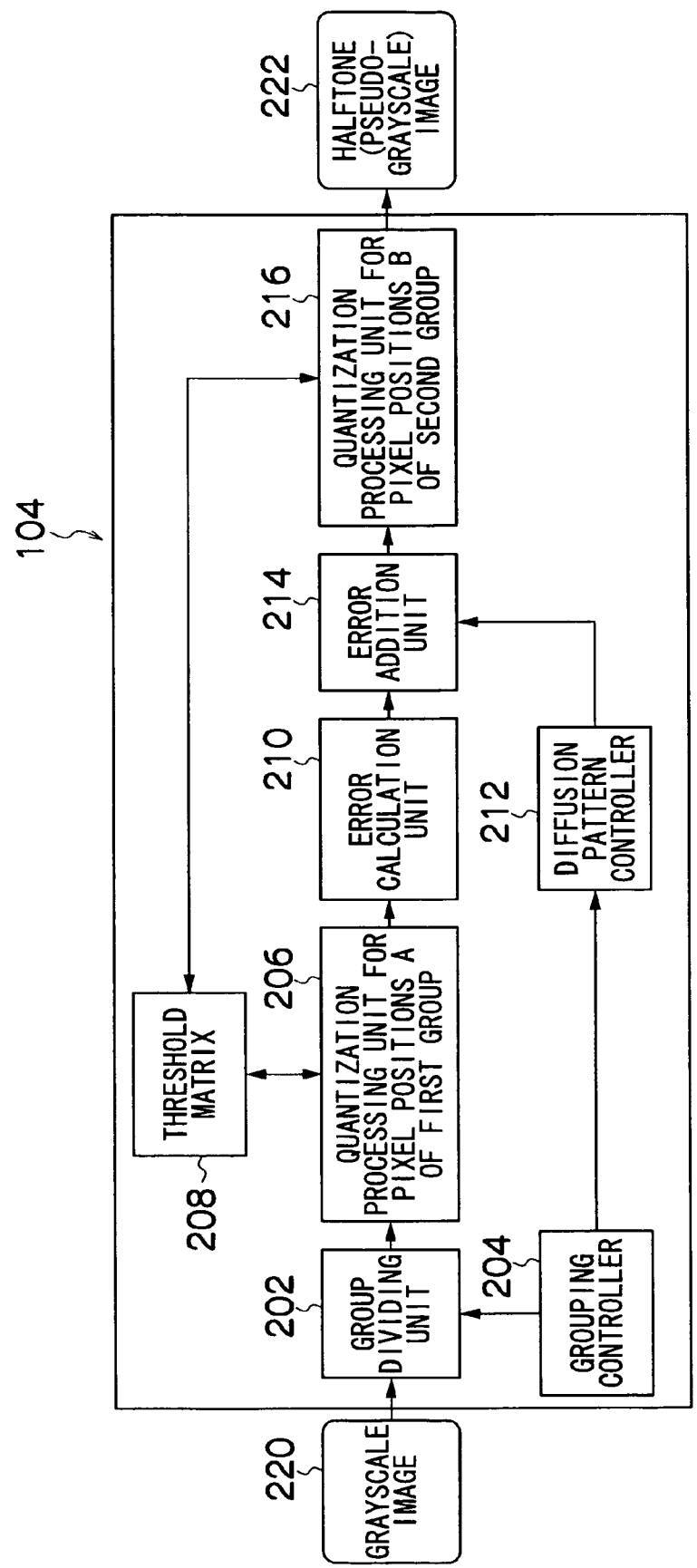

IMAGE PROCESSING METHOD, APPARATUS, AND PROGRAM WITH SELECTIVE ERROR DIFFUSION AMONG A PLURAITY OF PIXEL GROUPS WITHING A DIGITAL IMAGE

BACKGROUND OF THE INVENTION

1. Field of the Invention

The present invention relates to an image processing method and apparatus, and a program for realizing an image processing function on a computer, and more particularly to a favorable halftone image processing technique for an inkjet recording apparatus or another image forming apparatus.

2. Description of the Related Art

Typically, with an inkjet recording apparatus, grayscale images are formed by converting the shading of an image into an appropriate dot placement using a halftoning method typified by an error diffusion method and a dithering method (see Japanese Patent Application Publication Nos. 2001-157055, 2003-110852, 7-15606, etc.).

Japanese Patent Application Publication No. 2001-157055 proposes a method of evaluating the noticeability of dots quantitatively, quantizing the noticeable dots using an error diffusion method, and quantizing the other dots using a systematic dithering method. Japanese Patent Application Publication No. 2003-110852 proposes a halftone processing method in which a process of diffusing an error generated by quantization through a threshold matrix to peripheral unprocessed pixels is repeated successively. Japanese Patent Application Publication No. 7-15606 proposes a method in which a process of grouping gray value images into pixel (image element) line units and moving the quantization error of a subject pixel in a certain line to an adjacent pixel in the next line is repeated successively.

As described in Japanese Patent Application Publication Nos. 2003-110852 and 7-15606, a quantization process of diffusing an error generated by quantization through a threshold matrix to peripheral pixels is advantageous in that it enables high quality image reproduction, but is disadvantaged in that the calculation load required for successive quantization error diffusion is large. Furthermore, since sequential processing is required, parallel processing is difficult, and it is therefore difficult to increase the processing speed.

SUMMARY OF THE INVENTION

The present invention has been contrived in view of such circumstances, and an object thereof is to provide an image processing method and apparatus which can achieve parallel processing and a reduction in calculation load while realizing high quality image reproduction during the halftoning of a grayscale image, and a program for realizing a corresponding image processing function on a computer.

In order to attain the aforementioned object, the present invention is directed to an image processing method for performing halftoning of a digital image constituted by an array of pixels having grayscale values which correspond to a content of the digital image, the method comprising the steps of: grouping the pixels constituting the digital image into a first group comprising pixels in pixel positions from which a quantization error generated through quantization is diffused to a peripheral pixel, and a second group comprising pixels in pixel positions from which the quantization error generated through quantization is not diffused to a peripheral pixel; performing a first quantization process on the pixels belonging to the first group using a threshold matrix; determining the quantization error generated during the first quantization process; diffusing the quantization error obtained in the quantization error determining step to at least one non-quantized pixel belonging to the second group which is adjacent to the pixel subjected to the first quantization process; and performing a second quantization process, using a threshold matrix, on the non-quantized pixel to which an error value is diffused during the quantization error diffusing step.

A digital image is treated as a collection (array) of pixels, which are the smallest information units, and each pixel is provided with a grayscale value (a value expressing the degree of shading) corresponding to the image content. In the present invention, when the original image is subjected to halftoning and thereby converted into image data (dot data) having a lower gray level, processing is performed to divide the pixels into pixels (first group) which diffuse their own quantization errors to adjacent peripheral pixels, and pixels (second group) which are subjected to quantization at a value that takes into account the error supplied from the adjacent pixel, but do not diffuse their own quantization errors to other pixels.

A pixel belonging to the first group is quantized using a threshold matrix without taking into account the quantization errors of other, peripheral pixels, and the quantization error generated by this quantization is diffused to adjacent pixels of the second group. A pixel belonging to the second group is quantized using a threshold matrix after the pixel value thereof has been corrected in accordance with the error diffused from the pixel of the first group (error correction). The error generated by this quantization is not diffused to other pixels.

In so doing, the calculation load required for quantization can be reduced greatly. Furthermore, since this processing is not sequential processing, parallel processing can be constructed easily, enabling an increase in processing speed. Moreover, the errors generated during quantization are taken into account, albeit partially, and hence higher quality image reproduction than that of a conventional threshold matrix method can be realized.

Preferably, the pixels belonging to the first group are distributed at substantially uniform and regular intervals over a plurality of columns and a plurality of rows within a two-dimensional array of the pixels constituting the digital image.

As regards the distribution pattern of the pixels belonging to the first group, an aspect in which these pixels are distributed sparsely over the entire image surface at substantially uniform and regular intervals is preferable. In so doing, enhanced image quality and parallel processing can be realized. Note that in consideration of the error diffusion method, the pitch of the pixels belonging to the first group is preferably between approximately one and two pixels.

Preferably, the threshold matrix has a blue noise characteristic.

Regarding the spatial frequency of an image, enhanced image quality can usually be achieved by diffusing errors over a wide range in the low spatial frequency region. With the present invention, the error diffusion range is restricted, and therefore a threshold matrix with which favorable results can be obtained in the low and medium spatial frequency regions is preferably used. A blue noise mask is a matrix constructed mainly in consideration of the low and medium spatial frequency regions, and is therefore suitable for use in the first quantization step and second quantization step of the present invention.

Preferably, in the quantization error diffusing step, the quantization error obtained in the quantization error determining step is applied to the non-quantized pixels belonging to the second group in a predetermined ratio.

Examples of the quantization error diffusion pattern include an aspect in which the pixel positions of the error diffusion destinations and the error distribution ratio to each pixel position are determined in advance, whereupon the error is distributed to the pixel positions having this predetermined positional relationship in a predetermined ratio. Note that when there is only one diffusion destination pixel position, the error is transferred to this diffusion destination pixel position at a ratio of 100%.

Preferably, the quantization error diffusion step comprises an error distribution control step of controlling at least one of a diffusion destination pixel position of the quantization error obtained in the quantization error determining step, and an error distribution ratio.

The quantization error diffusion pattern may be determined in advance, or as described in claim 5, at least one of the diffusion destination pixel position and the error distribution ratio may be controlled appropriately.

Preferably, in the error distribution control step, at least one of the diffusion destination pixel position and the error distribution ratio is determined randomly.

By randomizing error distribution, unevenness in the unique patterns of the image can be prevented.

Preferably, in the error distribution control step, at least one of the diffusion destination pixel position and the error distribution ratio is controlled in accordance with a grayscale value gradient of the pixels on a periphery of the pixels subjected to the quantization process.

For example, as the gradient of peripheral pixels (the gradient of their grayscale values) increases, it is preferable to promote error diffusion in a perpendicular direction to the gradient direction and suppress error diffusion in the gradient direction. In so doing, edge reproduction is improved.

Preferably, in the error distribution control step, at least one of the diffusion destination pixel position and the error distribution ratio is controlled in accordance with a spatial frequency characteristic of the pixels on a periphery of the pixels subjected to the quantization process.

For example, when a threshold matrix having the aforementioned blue noise characteristic is used, an aspect may be employed in which error diffusion is suppressed as the high spatial frequency component becomes smaller. By employing the blue noise characteristic actively, the calculation load can be reduced even further.

Preferably, the image processing method further comprises the step of determining a representative value of a pixel range constituted by a subject pixel belonging to the first group and peripheral pixels thereof, wherein the representative value obtained in the representative value determining step is used as a value of the subject pixel, quantization is performed on the representative value using a threshold matrix, and a result of the quantization process is used as a quantization result of the subject pixel, whereby the error between the grayscale value of the subject pixel and the quantization result of the subject pixel is determined in the quantization error determining step.

When quantization is performed on a certain subject pixel belonging to the first group, a threshold matrix may be applied to the pixel value of the subject pixel, a representative value of a plurality of pixels, including the subject pixel and its peripheral pixels, may be calculated and used as the pixel value of the subject pixel, to which the threshold matrix is then applied. Determining a representative value leads to a slight increase in the calculation load, but enables a further improvement in image quality.

Note that the "peripheral pixels" forming the calculation range of the representative value may belong to the first group or the second group. Needless to say, peripheral pixels belonging to the first group and peripheral pixels belonging to the second group may be mixed together in the peripheral pixels of the calculation range.

Preferably, when the digital image is a color image comprising a plurality of color components, a size of the threshold matrix is varied according to the color.

When an appropriate threshold matrix is used for each color, taking dot overlap between colors into account, interference between the colors can be reduced.

Preferably, when the digital image is a color image comprising a plurality of color components, pixel positions of the pixels belonging to the first group are varied according to the color.

In the case of a color image comprising cyan (C), magenta (M), and yellow (Y) color components, for example, the pixels belonging to the first group of the visually striking cyan and magenta components are allocated different pixel positions to each other. In so doing, interference between the colors can be reduced.

Preferably, when the digital image is a color image comprising a plurality of color components, an error diffusion method is varied according to the color.

By varying the error diffusion pattern (diffusion method), for example the pixel positions of the error diffusion destinations or the error distribution ratio, according to color, interference between the colors can be reduced.

As described above, varying the quantization process according to color leads to a slight increase in the calculation load, but enables a further improvement in image quality.

Preferably, when the digital image is a color image comprising a plurality of color components, a plurality of color signals of a single pixel are gathered together and subjected to a vector quantization process.

According to this aspect, a further reduction in the calculation load can be achieved.

In order to attain the aforementioned object, the present invention is also directed to an image processing apparatus which performs halftoning of a digital image constituted by an array of pixels having grayscale values which correspond to a content of the digital image, the apparatus comprising: a grouping device which groups the pixels constituting the digital image into a first group comprising pixels in pixel positions from which a quantization error generated through quantization is diffused to a peripheral pixel, and a second group comprising pixels in pixel positions from which the quantization error generated through quantization is not diffused to a peripheral pixel; a first quantization device which performs a first quantization process on the pixels belonging to the first group using a threshold matrix; a quantization error determining device which determines the quantization error generated during the first quantization process; a quantization error diffusing device which diffuses the quantization error obtained by the quantization error determining device to at least one non-quantized pixel belonging to the second group which is adjacent to the pixel subjected to the first quantization process; and a second quantization device which performs a second quantization process, using a threshold matrix, on the non-quantized pixel to the quantization error is diffused by the quantization error diffusion device.

The present invention is also directed to an image forming apparatus, comprising: the above-described image processing apparatus; a discharge head formed with a nozzle which discharges liquid droplets; and a discharge control device which controls discharge from the discharge head according to halftone image data obtained by the image processing apparatus, wherein an image is formed on a recording medium by the liquid droplets discharged from the nozzles.

A full-line recording head, which is provided with a nozzle array comprising a plurality of ink discharging nozzles arranged in series over a length that corresponds to the entire width of the recording medium, may be used as the discharge head.

In this case, an aspect may be employed in which a plurality of comparatively short discharge head blocks, each comprising a nozzle array that does not extend over a length corresponding to the entire width of the recording medium, are combined and connected to form a nozzle array which as a whole extends over a length corresponding to the entire width of the recording medium.

A "full-line recording head (droplet discharging head)" is normally disposed along the direction orthogonal to the relative feed direction (direction of relative movement) of the printing medium, but also possible is an aspect in which the recording head is disposed along the diagonal direction given a predetermined angle with respect to the direction orthogonal to the feed direction. The array form of the nozzles in the recording head is not limited to a single row array in the form of a line, and a matrix array composed of a plurality of rows is also possible. Also possible is an aspect in which a plurality of short-length recording head units having a row of nozzles that do not have lengths that correspond to the entire width of the printing medium are combined, whereby the image-recording element rows are configured so as to correspond to the entire width of the printing medium, with these units acting as a whole.

The "recording medium" is a medium (an object that may be referred to as a print medium, image formation medium, recording medium, image receiving medium, or the like) that receives images recorded by the action of the recording head and includes continuous paper, cut paper, seal paper, OHP sheets, and other resin sheets, as well as film, cloth, printed substrates on which wiring patterns or the like are formed with an inkjet recording apparatus, and various other media without regard to materials or shapes. In the present specification, the term "printing" expresses the concept of not only the formation of characters, but also the formation of images with a broad meaning that includes characters.

The term "moving device (conveyance device)" includes an aspect in which the printing medium is moved with respect to a stationary (fixed) recording head, an aspect in which the recording head is moved with respect to a stationary printing medium, or an aspect in which both the recording head and the printing medium are moved.

The present invention is also directed to a program for realizing the functions of the image processing apparatus described above on a computer.

More specifically, the present invention is also directed to a computer readable medium having embodied thereon an image processing program for performing, by a computer, halftoning of a digital image constituted by an array of pixels having grayscale values which correspond to a content of the digital image, the image processing program comprising: a first code segment for grouping the pixels constituting the digital image into a first group comprising pixels in pixel positions from which a quantization error generated through quantization is diffused to a peripheral pixel, and a second group comprising pixels in pixel positions from which the quantization error generated through quantization is not diffused to a peripheral pixel; a second code segment for performing a first quantization process on the pixels belonging to the first group using a threshold matrix; a third code segment for determining the quantization error generated in the first quantization process; a fourth code segment for diffusing the determined quantization error to at least one non-quantized pixel belonging to the second group which is adjacent to the pixel subjected to the first quantization process; and a fifth code segment for performing a second quantization process, using a threshold matrix, on the non-quantized pixel to which an error value is diffused during the diffusing of the determined quantization error.

The medium may be a propagated signal, which may be a carrier wave.

The image processing program of the present invention may be applied as an operating program for a central processing unit (CPU) installed in an image output apparatus such as a printer or display apparatus, or may be applied to a computer system such as a personal computer. Furthermore, the image processing program of the present invention may be constituted by a single piece of application software, or incorporated into an application such as driver software or image editing software.

According to the present invention, pixels (first group) which are quantized by a threshold matrix without performing error correction, and which diffuse the error generated by this quantization to peripheral pixels, are separated from pixels (second group) which are quantized following error correction in accordance with the diffused error, but do not diffuse the error generated by this quantization to peripheral pixels. As a result, the calculation load required for the quantization processing can be reduced greatly below the calculation load required conventionally.

Further, since the halftoning process of the present invention is not sequential processing, parallel processing can be executed, enabling an increase in processing speed. Moreover, since the present invention takes account of the errors generated during quantization of a part of the pixels, images having a higher image quality than those produced by a conventional threshold matrix method can be obtained.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a plan view of principal components of an area around a printing unit of the inkjet recording apparatus in FIG. 1;

FIG. 3C is a perspective plan view showing another example of the configuration of the print head.

FIG. 13D is a flowchart showing another example of a quantization processing procedure;

FIG. 13E is a flowchart showing another example of a quantization processing procedure;

FIG. 19G is a flowchart showing a subroutine of vector quantization processing; and FIG. 20 is a block diagram showing a constitutional example of a digital halftoning processing unit.

DETAILED DESCRIPTION OF THE PREFERRED EMBODIMENTS

General Configuration of an Inkjet Recording Apparatus

Figure 1:
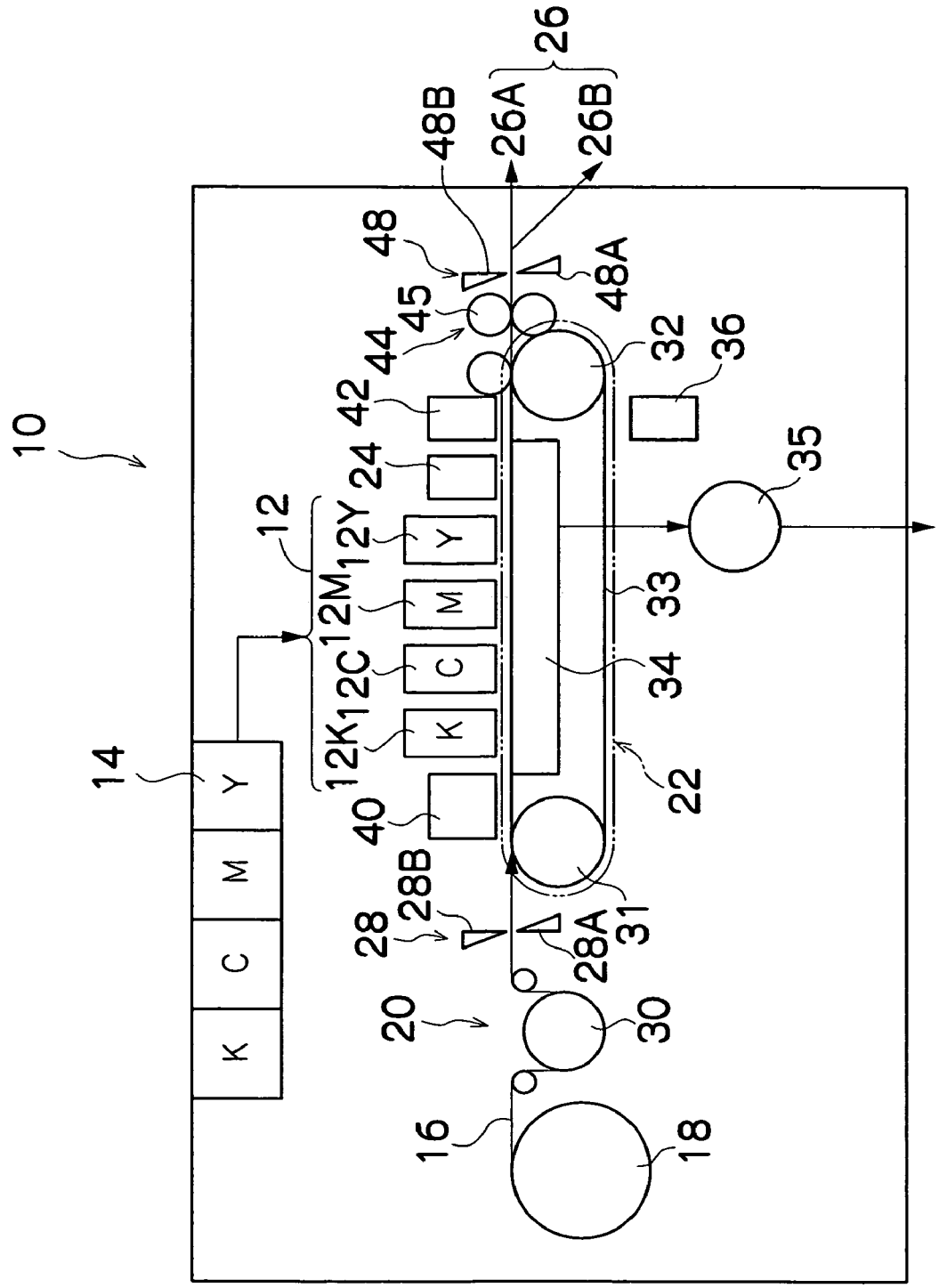
FIG. 1 is a general schematic drawing of an inkjet recording apparatus according to an embodiment of the present invention.

FIG. 1 is a general schematic drawing of an inkjet recording apparatus according to an embodiment of the present invention. As shown in FIG. 1, the inkjet recording apparatus 10 comprises: a printing unit 12 having a plurality of print heads 12K, 12C, 12M, and 12Y for ink colors of black (K), cyan (C), magenta (M), and yellow (Y), respectively; an ink storing/loading unit 14 for storing inks to be supplied to the print heads 12K, 12C, 12M, and 12Y; a paper supply unit 18 for supplying recording paper 16; a decurling unit 20 for removing curl in the recording paper 16; a suction belt conveyance unit 22 disposed facing the nozzle face (ink-droplet ejection face) of the print unit 12, for conveying the recording paper 16 while keeping the recording paper 16 flat; a print determination unit 24 for reading the printed result produced by the printing unit 12; and a paper output unit 26 for outputting image-printed recording paper (printed matter) to the exterior.

The ink storing/loading unit 14 has tanks for storing the inks to be supplied to the print heads 12K, 12C, 12M, and 12Y, and the tanks are connected to the print heads 12K, 12C, 12M, and 12Y through channels (not shown), respectively. The ink storing/loading unit 14 has a warning device (e.g., a display device, an alarm sound generator) for warning when the remaining amount of any ink is low, and has a mechanism for preventing loading errors among the colors.

In FIG. 1, a single magazine for rolled paper (continuous paper) is shown as an example of the paper supply unit 18; however, a plurality of magazines with paper differences such as paper width and quality may be jointly provided. Moreover, paper may be supplied with a cassette that contains cut paper loaded in layers and that is used jointly or in lieu of a magazine for rolled paper.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

In the case of the configuration in which roll paper is used, a cutter (first cutter) 28 is provided as shown in FIG. 1, and the continuous paper is cut into a desired size by the cutter 28. The cutter 28 has a stationary blade 28A, whose length is equal to or greater than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut paper is used, the cutter 28 is not required.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and the suction chamber 34 provides suction with a fan 35 to generate a negative pressure, and the recording paper 16 is held on the belt 33 by suction.

The belt 33 is driven in the clockwise direction in FIG. 1 by the motive force of a motor (not shown in FIG. 1, but shown as a motor 88 in FIG. 7) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not depicted, examples thereof include a configuration in which the belt 33 is nipped with a cleaning roller such as a brush roller and a water absorbent roller, an air blow configuration in which clean air is blown onto the belt 33, or a combination of these. In the case of the configuration in which the belt 33 is nipped with the cleaning roller, it is preferable to make the line velocity of the cleaning roller different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Each of the print heads 12K, 12C, 12M, and 12Y of the printing unit 12 is composed of a so-called full-line head having a length that corresponds to the maximum paper width intended for use in the inkjet recording apparatus 10, in which a plurality of ink-droplet ejection apertures (nozzles) are arranged along a length that exceeds at least one side of the maximum-size recording paper 16 (i.e. along the entire width of the printable area in the recording paper 16).

The print heads 12K, 12C, 12M, and 12Y are arranged in this order from the upstream side along the direction substantially perpendicular to the delivering direction of the recording paper 16 (hereinafter referred to as the paper conveyance direction). A color print can be formed on the recording paper 16 by ejecting the inks from the print heads 12K, 12C, 12M, and 12Y, respectively, onto the recording paper 16 while conveying the recording paper 16.

Although the configuration with the KCMY four standard colors is described in the present embodiment, combinations of the ink colors and the number of colors are not limited to those, and light and/or dark inks can be added as required. For example, a configuration is possible in which print heads for ejecting light-colored inks such as light cyan and light magenta are added. Moreover, a configuration is possible in which a single print head adapted to record an image in the colors of CMY or KCMY is used instead of the plurality of print heads for the respective colors. In addition, the arrangement order of the print heads 12K, 12C, 12M, and 12Y is not limited to those.

The print unit 12, in which the full-line heads covering the entire width of the paper are thus provided for the respective ink colors, can record an image over the entire surface of the recording paper 16 by performing the action of moving the recording paper 16 and the print unit 12 relatively to each other in the sub-scanning direction just once (i.e., with a single sub-scan). Higher-speed printing is thereby made possible and productivity can be improved in comparison with a shuttle type head configuration in which a print head reciprocates in the main scanning direction.

The print determination unit 24 has an image sensor for capturing an image of the ink-droplet deposition result of the print unit 12, and functions as a device to check for ejection defects such as clogs of the nozzles in the print unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern printed with the print heads 12K, 12C, 12M, and 12Y for the respective colors, and the ejection of each head is determined. The ejection determination includes the presence of the ejection, measurement of the dot size, and measurement of the dot deposition position. The details of the ejection determination are described later.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathway in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, a sorter for collecting prints according to print orders is provided to the paper output unit 26A for the target prints.

Structure of Print Head

Next, the structure of the print heads is described. The print heads 12K, 12C, 12M and 12Y have the same structure, and a reference numeral 50 is hereinafter designated to any of the print heads 12K, 12C, 12M and 12Y.

Figure 3A:
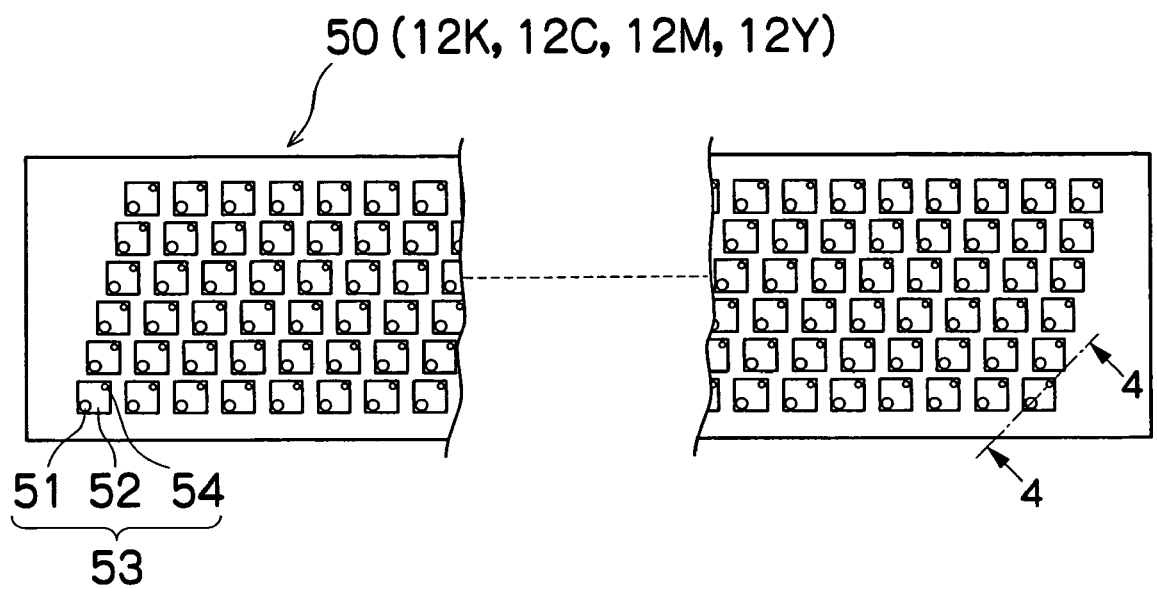
FIG. 3A is a perspective plan view showing an example of a configuration of a print head.

FIG. 3A is a perspective plan view showing an example of the configuration of the print head 50, and FIG. 3C is a perspective plan view showing another example of the configuration of the print head.

The nozzle pitch in the print head 50 should be minimized in order to maximize the density of the dots printed on the surface of the recording paper. As shown in FIG. 3A, the print head 50 in the present embodiment has a structure in which a plurality of ink chamber units 53 including nozzles 51 for ejecting ink-droplets and pressure chambers 52 connecting to the nozzles 51 are disposed in the (two-dimensional) form of a staggered matrix, and the effective nozzle pitch (the projective nozzle pitch) is thereby made small along the longitudinal direction of the print head 50 (along the direction opposite to the paper conveyance direction).

The print head 50 in the present embodiment is not limited to a configuration in which one or more nozzle rows in which the ink discharging nozzles 51 are arranged along a length corresponding to the entire width of the recording paper 16 in the direction substantially perpendicular to the paper conveyance direction. Alternatively, as shown in FIG. 3C, a full-line head can be composed of a plurality of short two-dimensionally arrayed head units 50' arranged in the form of a staggered matrix and combined so as to form nozzle rows having lengths that correspond to the entire width of the recording paper 16.

Figure 3B:
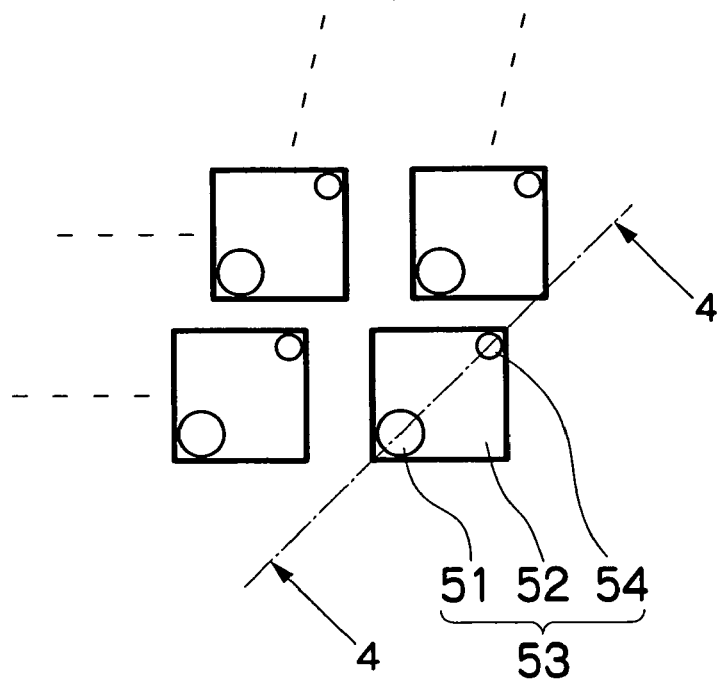
FIG. 3B is a partial enlarged view of FIG. 3A.

As shown in FIGS. 3A and 3B, the planar shape of the pressure chamber 52 provided for each nozzle 51 is substantially a square, and an outlet to the nozzle 51 and an inlet for supplied ink (supply port) 54 are disposed in both corners on a diagonal line of the square. The shape of the pressure chamber 52 is not limited to the present example, and the planar shape may one of various shapes, such as a quadrilateral shape (diamond, rectangle, or the like), another polygonal shape, such as a pentagon or hexagon, or a circular or elliptical shape.

Figure 4:
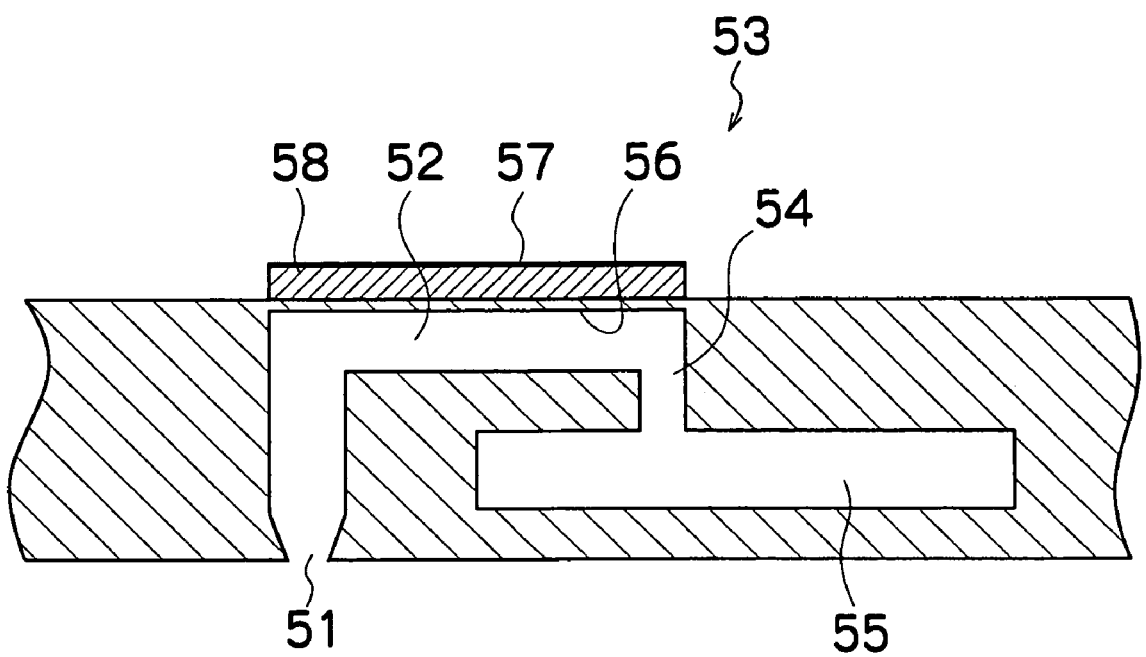
FIG. 4 is a cross-sectional view along a line 4-4 in FIGS. 3A and 3B.

As shown in FIG. 4, each pressure chamber 52 is connected to a common channel 55 through the supply port 54. The common channel 55 is connected to an ink tank 60 (not shown in FIG. 4, but shown as a numeral 60 in FIG. 6), which is a base tank that supplies ink, and the ink supplied from the ink tank 60 is delivered through the common flow channel 55 to the pressure chambers 52.

An actuator 58 provided with an individual electrode 57 is bonded to a pressure plate (diaphragm) 56, which forms a part (the upper face in FIG. 4) of the pressure chamber 52. When a drive voltage is applied to the individual electrode 57, the actuator 58 is deformed, the volume of the pressure chamber 52 is thereby changed, and the pressure in the pressure chamber 52 is thereby changed, so that the ink inside the pressure chamber 52 is thus ejected through the nozzle 51. The actuator 58 is preferably a piezoelectric element. When ink is ejected, new ink is supplied to the pressure chamber 52 from the common flow channel 55 through the supply port 54.

Figure 5:
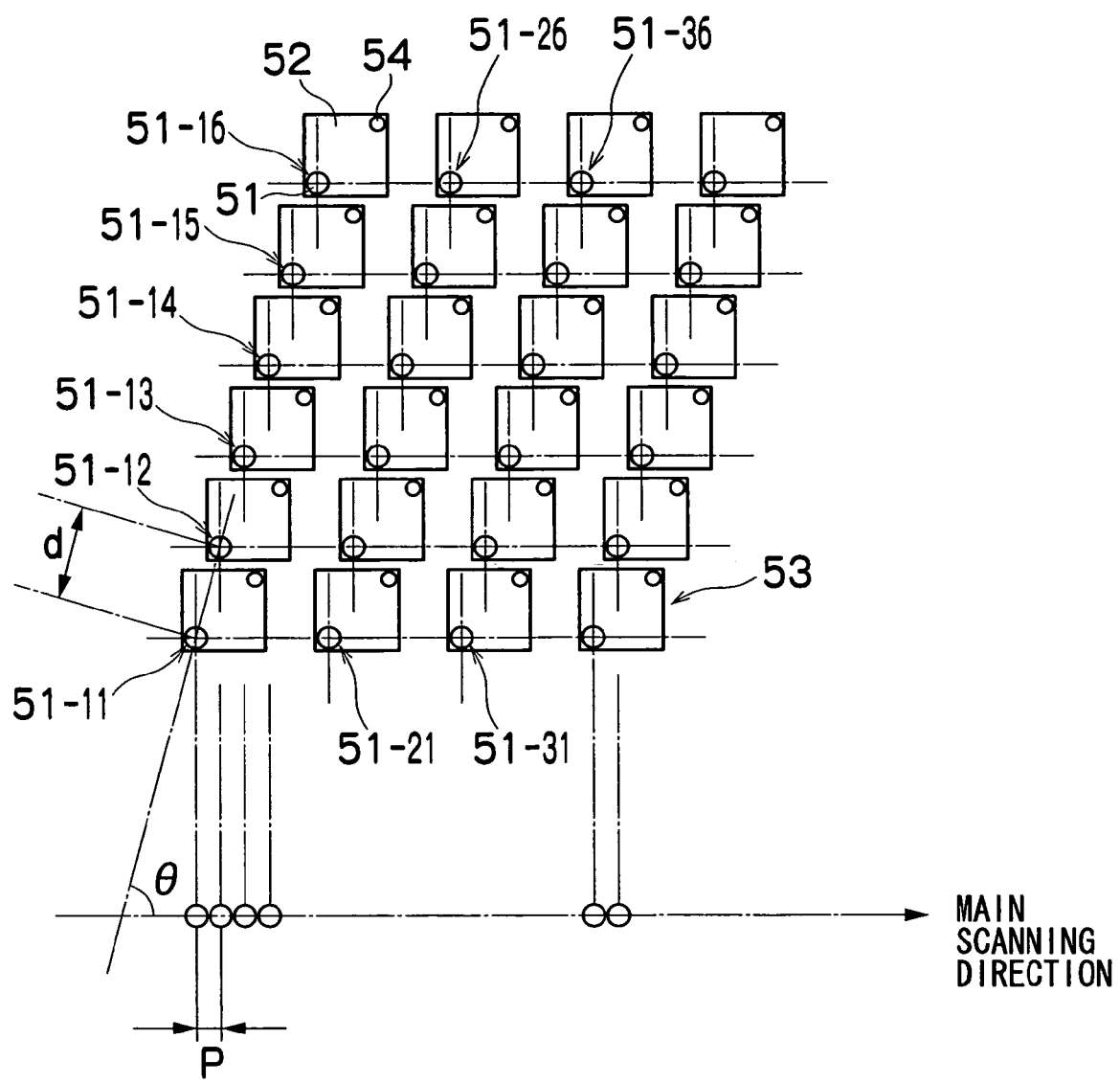
FIG. 5 is an enlarged view showing nozzle arrangement of the print head in FIG. 3A.

The plurality of ink chamber units 53 having such a structure are arranged in a grid with a fixed pattern in the line-printing direction along the main scanning direction and in the diagonal-row direction forming a fixed angle θ that is not a right angle with the main scanning direction, as shown in FIG. 5. With the structure in which the plurality of rows of ink a chamber units 53 are arranged at a fixed pitch d in the direction at the angle θ with respect to the main scanning direction, the nozzle pitch P as projected in the main scanning direction is d×cos θ.

Hence, the nozzles 51 can be regarded to be equivalent to those arranged at a fixed pitch P on a straight line along the main scanning direction. Such configuration results in a nozzle structure in which the nozzle row projected in the main scanning direction has a high density of up to 2,400 nozzles per inch. For convenience in description, the structure is described below as one in which the nozzles 51 are arranged at regular intervals (pitch P) in a straight line along the lengthwise direction of the head 50, which is parallel with the main scanning direction.

In a full-line head comprising rows of nozzles that have a length corresponding to the maximum recordable width, the "main scanning" is defined as to print one line (a line formed of a row of dots, or a line formed of a plurality of rows of dots) in the width direction of the recording paper (the direction perpendicular to the delivering direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other.

In particular, when the nozzles 51 arranged in a matrix such as that shown in FIG. 5 are driven, the main scanning according to the above-described (3) is preferred. More specifically, the nozzles 51-11, 51-12, 51-13, 51-14, 51-15 and 51-16 are treated as a block (additionally; the nozzles 51-21, 51-22, . . . , 51-26 are treated as another block; the nozzles 51-31, 51-32, . . . , 51-36 are treated as another block, . . . ); and one line is printed in the width direction of the recording paper 16 by sequentially driving the nozzles 51-11, 51-12, . . . , 51-16 in accordance with the conveyance velocity of the recording paper 16.

On the other hand, the "sub-scanning" is defined as to repeatedly perform printing of one line (a line formed of a row of dots, or a line formed of a plurality of rows of dots) formed by the main scanning, while moving the full-line head and the recording paper relatively to each other.

In the implementation of the present invention, the structure of the nozzle arrangement is not particularly limited to the examples shown in the drawings. Moreover, the present embodiment adopts the structure that ejects ink-droplets by deforming the actuator 58 such as a piezoelectric element; however, the implementation of the present invention is not particularly limited to this. Instead of the piezoelectric inkjet method, various methods may be adopted including a thermal inkjet method in which ink is heated by a heater or another heat source to generate bubbles, and ink-droplets are ejected by the pressure thereof.

Configuration of Ink Supply System

Figure 6:
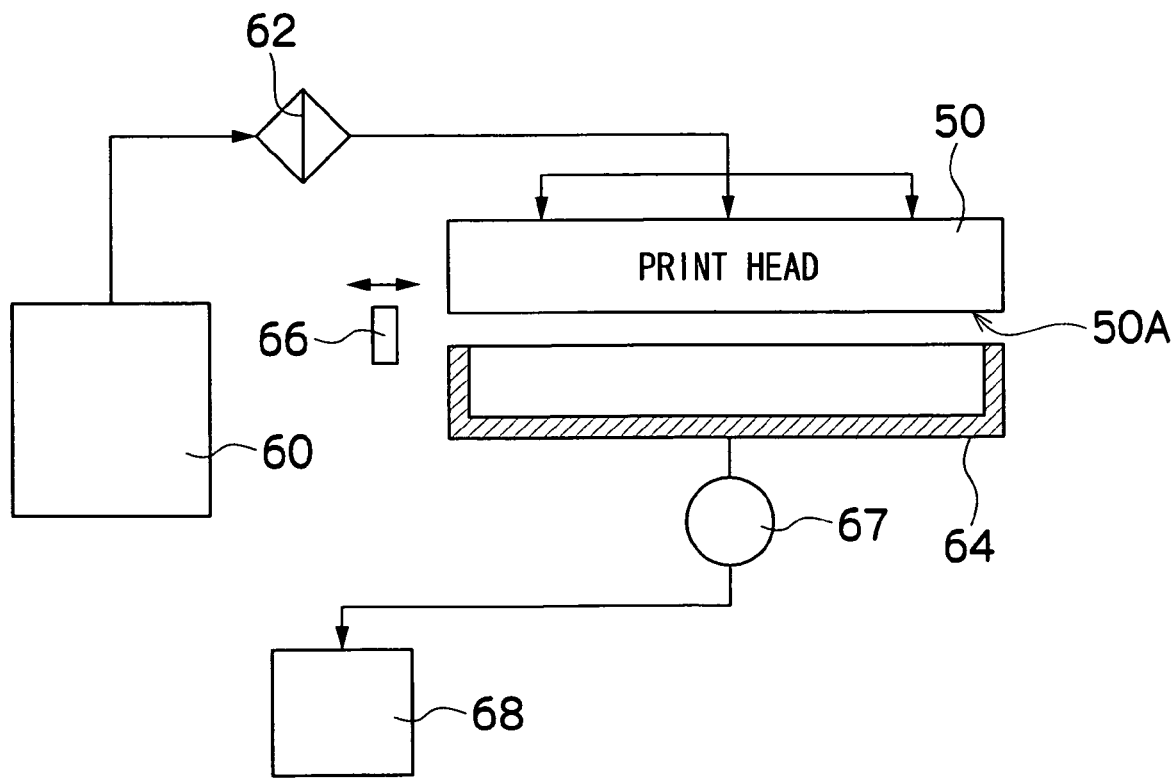
FIG. 6 is a schematic drawing showing a configuration of an ink supply system in the inkjet recording apparatus.

FIG. 6 is a schematic drawing showing the configuration of the ink supply system in the inkjet recording apparatus 10. An ink supply tank 60 is a base tank that supplies ink and is set in the ink storing/loading unit 14 described with reference to FIG. 1. The aspects of the ink supply tank 60 include a refillable type and a cartridge type: when the remaining amount of ink is low, the ink supply tank 60 of the refillable type is filled with ink through a filling port (not shown) and the ink supply tank 60 of the cartridge type is replaced with a new one. In order to change the ink type in accordance with the intended application, the cartridge type is suitable, and it is preferable to represent the ink type information with a bar code or the like on the cartridge, and to perform ejection control in accordance with the ink type. The ink supply tank 60 in FIG. 6 is equivalent to the ink storing/loading unit 14 in FIG. 1 described above.

A filter 62 for removing foreign matters and bubbles is disposed between the ink supply tank 60 and the print head 50, as shown in FIG. 6. The filter mesh size in the filter 62 is preferably equivalent to or less than the diameter of the nozzle and commonly about 20 μm. Although not shown in FIG. 6, it is preferable to provide a sub-tank integrally to the print head 50 or nearby the print head 50. The sub-tank has a damper function for preventing variation in the internal pressure of the head and a function for improving refilling of the print head.

The inkjet recording apparatus 10 is also provided with a cap 64 as a device to prevent the nozzle 51 from drying out or to prevent an increase in the ink viscosity in the vicinity of the nozzles, and a cleaning blade 66 as a device to clean the nozzle face. A maintenance unit including the cap 64 and the cleaning blade 66 can be moved in a relative fashion with respect to the print head 50 by a movement mechanism (not shown), and is moved from a predetermined holding position to a maintenance position below the print head 50 as required.

The cap 64 is displaced up and down relatively with respect to the print head 50 by an elevator mechanism (not shown). When the power of the inkjet recording apparatus 10 is switched OFF or when in a print standby state, the cap 64 is raised to a predetermined elevated position so as to come into close contact with the print head 50, and the nozzle face 50A is thereby covered with the cap 64.

The cleaning blade 66 is composed of rubber or another elastic member, and can slide on the ink ejection surface (surface of the nozzle plate) of the print head 50 by means of a blade movement mechanism (not shown). When ink droplets or foreign matter has adhered to the nozzle plate, the surface of the nozzle plate is wiped, and the surface of the nozzle plate is cleaned by sliding the cleaning blade 66 on the nozzle plate.

During printing or standby, when the frequency of use of specific nozzles is reduced and ink viscosity increases in the vicinity of the nozzles, a preliminary ejection is made toward the cap 64 to eject the degraded ink.

Also, when bubbles have become intermixed in the ink inside the print head 50 (inside the pressure chamber), the cap 64 is placed on the print head 50, ink (ink in which bubbles have become intermixed) inside the pressure chamber is removed by suction with a suction pump 67, and the suction-removed ink is sent to a collection tank 68. This suction action entails the suctioning of degraded ink of which viscosity has increased (hardened) when initially loaded into the head, or when service has started after a long period of being stopped.

When a state in which ink is not ejected from the print head 50 continues for a certain amount of time or longer, the ink solvent in the vicinity of the nozzles 51 evaporates and ink viscosity increases. In such a state, ink can no longer be ejected from the nozzle 51 even if the actuator 58 for the ejection driving is operated. Before reaching such a state the actuator 58 is operated (in a viscosity range that allows ejection by the operation of the actuator 58), and the preliminary ejection is made toward the ink receptor to which the ink of which viscosity has increased in the vicinity of the nozzle is to be ejected. After the nozzle surface is cleaned by a wiper such as the cleaning blade 66 provided as the cleaning device for the nozzle face, a preliminary ejection is also carried out in order to prevent the foreign matter from becoming mixed inside the nozzles 51 by the wiper sliding operation. The preliminary ejection is also referred to as "dummy ejection", "purge", "liquid ejection", and so on.

When bubbles have become intermixed in the nozzle 51 or the pressure chamber 52, or when the ink viscosity inside the nozzle 51 has increased over a certain level, ink can no longer be ejected by the preliminary ejection, and a suctioning action is carried out as follows.

More specifically, when bubbles have become intermixed in the ink inside the nozzle 51 and the pressure chamber 52, ink can no longer be ejected from the nozzles even if the actuator 58 is operated. Also, when the ink viscosity inside the nozzle 51 has increased over a certain level, ink can no longer be ejected from the nozzle 51 even if the actuator 58 is operated. In these cases, a suctioning device to remove the ink inside the pressure chamber 52 by suction with a suction pump, or the like, is placed on the nozzle face of the print head 50, and the ink in which bubbles have become intermixed or the ink of which viscosity has increased is removed by suction.

However, this suction action is performed with respect to all the ink in the pressure chamber 52, so that the amount of ink consumption is considerable. Therefore, a preferred aspect is one in which a preliminary ejection is performed when the increase in the viscosity of the ink is small.

Description of Control System

Figure 7:
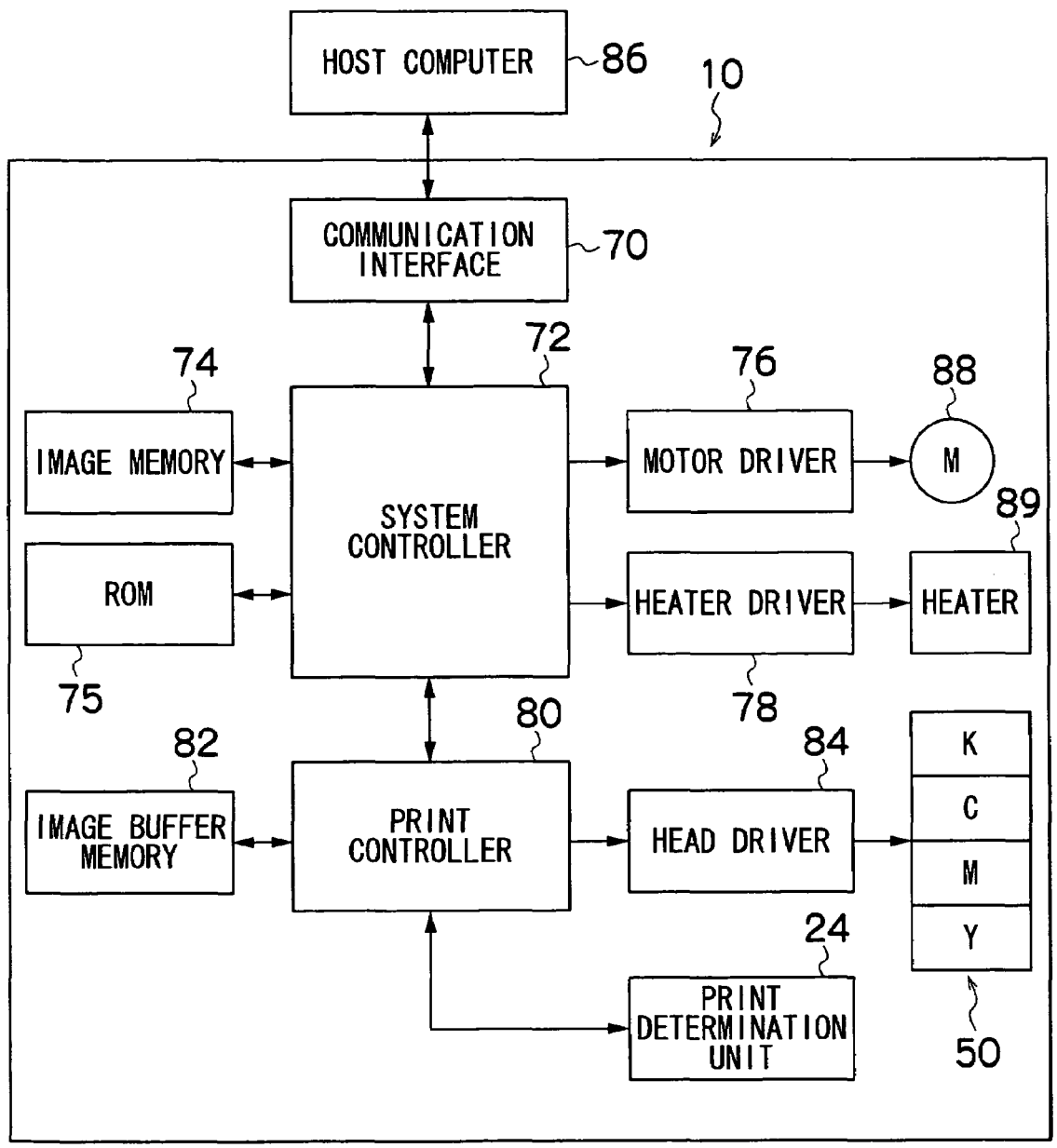
FIG. 7 is a block diagram of principal components showing a system configuration of the inkjet recording apparatus.

FIG. 7 is a block diagram of the principal components showing the system configuration of the inkjet recording apparatus 10. The inkjet recording apparatus 10 has a communication interface 70, a system controller 72, an image memory 74, ROM 75, a motor driver 76, a heater driver 78, a print controller 80, an image buffer memory 82, a history information storing unit 83, a head driver 84, an ejection determination controller 85, and other components.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to memory composed of a semiconductor element, and a hard disk drive or another magnetic medium may be used.

The system controller 72 functions as a control device for controlling the whole inkjet recording apparatus 10 in accordance with a prescribed program, and it also functions as a calculating device for performing various types of calculations. More specifically, the system controller 72 is constituted by a central processing unit (CPU), peripheral circuits relating to same, and the like. The system controller 72 controls respective units, such as the communications interface 70, image memory 74, ROM 75, motor driver 76, and the like, and it also controls communications with the host computer 86 and read and write operations to and from the image memory 74, ROM 75, and the like, as well as generating control signals for controlling the conveyance motor 88 and the heater 89.

The ROM 75 stores programs executed by the CPU of the system controller 72, various data required for control procedures, and the like. It is preferable that the ROM 75 is a non-rewriteable storage device, or a rewriteable storage device such as an EEPROM. The image memory 74 is used as a temporary storage region for image data, and it is also used as a program development region and a calculation work region for the CPU.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 is a control unit having a signal processing function for performing various treatment processes, corrections, and the like, in accordance with the control implemented by the system controller 72, in order to generate a signal for controlling printing, from the image data in the image memory 74, and it supplies the print control signal (image data) thus generated to the head driver 84. Prescribed signal processing is carried out in the print controller 80, and the ejection amount and the ejection timing of the ink droplets from the respective print heads 50 are controlled via the head drier 84, on the basis of the image data. By this means, prescribed dot size and dot positions can be achieved.

Figure 8:
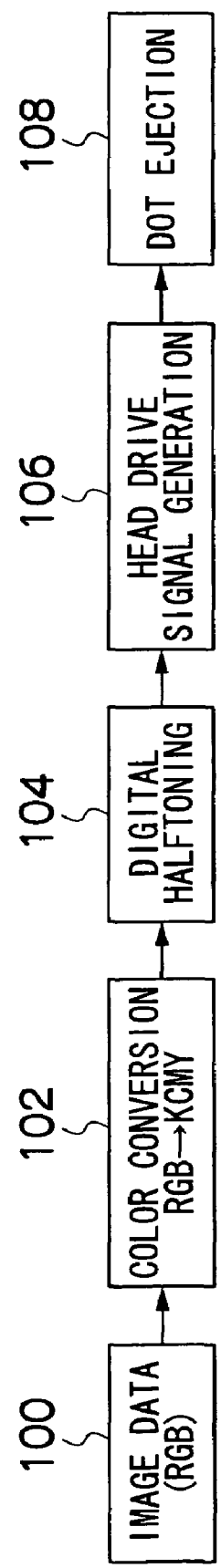
FIG. 8 is a block diagram showing an outline of an image processing function of the inkjet recording apparatus of the present embodiment.

The print controller 80 is provided with the image buffer memory 82; and image data, parameters, and other data are temporarily stored in the image buffer memory 82 when image data is processed in the print controller 80. The aspect shown in FIG. 8 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives the actuator for the print heads F12K, 12C, 12M, and 12Y for each color on the basis of print data provided from the print controller 80. The head driver 84 may include a feedback controller to maintain a constant driving condition of the head.

The data of the image to be printed are inputted from outside through the communication interface 70, and stored in the image memory 74. At this stage, the RGB image data are stored in the image memory 74.

The image data stored in the image memory 74 are transmitted to the print controller 80 via the system controller 72 and converted into dot data corresponding to each ink color in the print controller 80. In other words, the print controller 80 performs processing to convert the inputted RGB image data into dot data for the four colors KCMY. The dot data generated in the print controller 80 are stored in the image buffer memory 82.

The head driver 84 generates a drive control signal of the head 50 on the basis of the dot data stored in the image buffer memory 82. By applying the drive control signal generated by the head driver 84 to the head 50, ink is discharged from the head 50. Ink ejection from the head 50 is controlled in synchronization with the feed speed of the recording paper 16 such that an image is formed on the recording paper 16.

As described with reference to FIG. 1, the print determination unit 24 is a block comprising a line sensor, which functions to read the image printed on the recording paper 16, determine the print condition (whether ink has been discharged, whether there are any ejection defects, and so on) by performing the required signal processing and the like, and provide the print controller 80 with the determination results.

The print controller 80 performs various corrections on the head 50 as needed on the basis of the information obtained from the print determination unit 24.

Description of Image Processing

Next, image signal processing in the above inkjet recording apparatus 10 will be described.

FIG. 8 is a block diagram showing an outline of an image processing function in the inkjet recording apparatus 10 of the present embodiment. As shown in the diagram, the inkjet recording apparatus 10 comprises a color conversion unit 102 for generating KCMY data from the inputted image data (RGB data) 100, a digital halftoning processing unit 104, and a head drive signal generating unit 106, and is designed to generate a drive signal of the head 50 on the basis of the dot data obtained as a result of the digital halftoning, and implement dot ejection 108 as required.

As described with reference to FIG. 7, the image data (RGB data) 100 to be printed are inputted into the inkjet recording apparatus 10 through a predetermined image input unit such as the communication interface 70, and transmitted to the color conversion unit 102 shown in FIG. 8. The color conversion unit 102 performs processing to convert the RGB data of each pixel in the image into corresponding KCMY data. The KCMY data generated by the color conversion unit 102 are subjected to gradation correction processing and the like, and then transmitted to the digital halftoning processing unit 104.

The digital halftoning processing unit 104 converts the KCMY grayscale image into a pseudo-grayscale image dot placement by halftoning the KCMY grayscale image. The pseudo-grayscale image is generated by an algorithm that combines quantization processing using a threshold matrix and error diffusion, as will be described in detail hereafter. In the ink jet recording apparatus 10, an image which, to the human eye, has a pseudo-continuous tone is formed by varying the ejection density and size of the fine ink (color material) dots, and therefore the KCMY grayscale image must be converted into a dot placement which can reproduce the gradation (shading) of the inputted digital image as faithfully as possible. The digital halftoning processing unit 104 uses a halftoning algorithm to be described below to generate a dot placement from the inputted image data.

Halftoning Process Method

Figure 9:
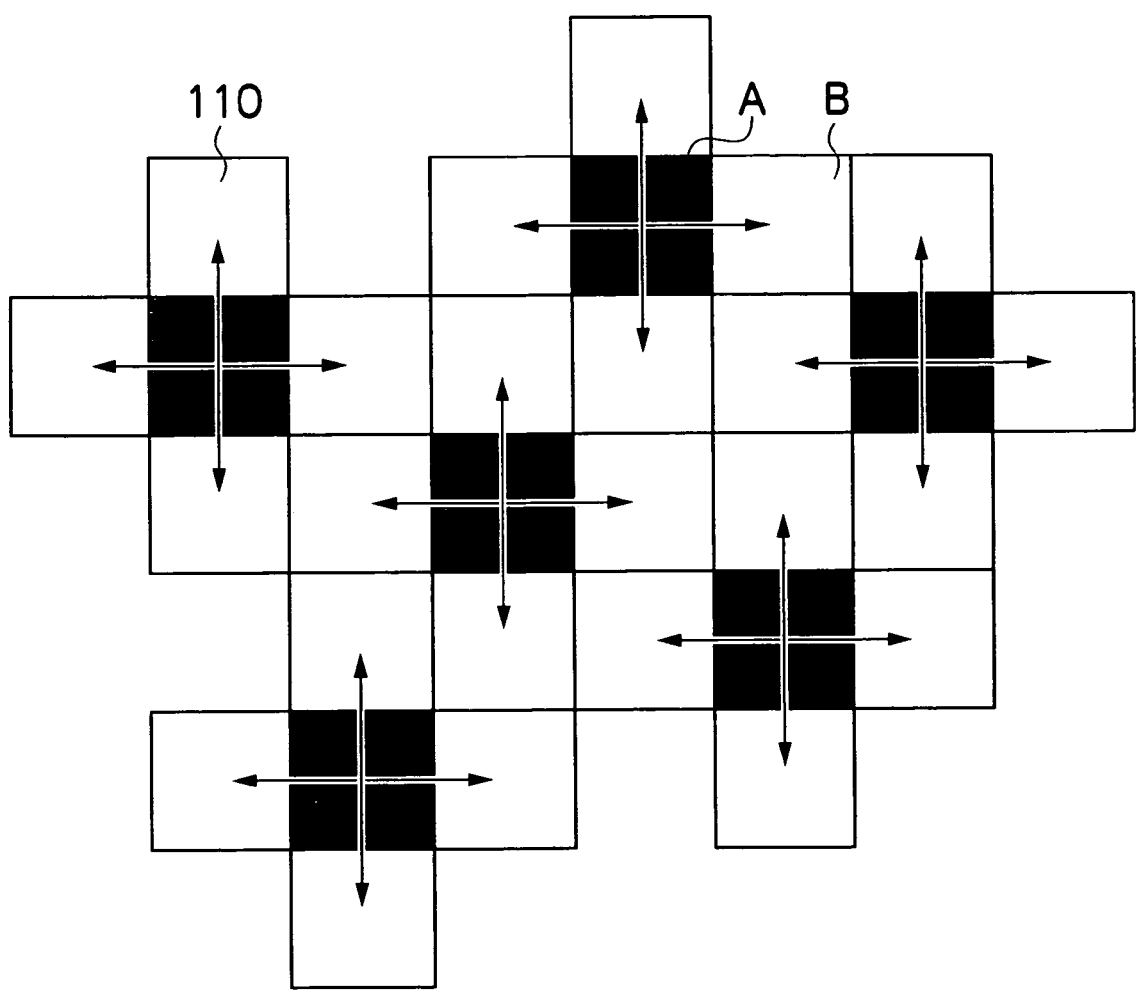
FIG. 9 is a pattern diagram showing a first example of pixel grouping and a quantization error diffusion pattern.

A halftoning process method of the present embodiment will now be described. FIG. 9 is a pattern diagram showing a part of a pixel array constituting a digital image, in which each square represents a pixel 110. As shown in the drawing, the pixels 110 are disposed in a two-dimensional array in a row direction and a column direction. The pixels are divided into a group comprising pixels in a pixel position A, illustrated in black in FIG. 9, and a group comprising pixels in a pixel position B, illustrated in white in FIG. 9. For ease of description, the pixel group comprising the pixels in the pixel position A will be referred to as a "first group", and the pixel group comprising the pixels in the pixel position B will be referred to as a "second group".

In the pixel position A, error correction from peripheral pixels is not performed, and an error (quantization error) generated by quantization using a threshold matrix is diffused to the adjacent pixel positions B of the second group. The arrows in FIG. 9 show the diffusion destination pixel positions of the quantization error generated by quantization of each pixel position A.

The pixel position B is quantized following correction in accordance with the diffused error. The error generated by quantization of the pixel position B is not calculated, and therefore no processing is performed to diffuse this error to other pixel positions.

The pixel positions A are distributed sparsely over the entire image surface at substantially uniform and regular intervals. The pixel positions A are preferably removed from each other by one or two pixels.

In the example in FIG. 9, a distribution pattern in which the pixel positions A are fixed at a ratio of one pixel to every five pixels in the row direction (in other words, an array pattern in which four pixels belonging to the second group exist between each pixel position A in the row direction) is repeated in the row direction while being offset at a pitch of two pixels in the column direction.

Also in FIG. 9, the quantization error of the pixel position A is diffused to the four pixel positions B adjacent to the corresponding pixel position A to the top, bottom, left, and right. Measures are also taken to ensure that the pixel positions B serving as the diffusion destinations of the quantization errors generated in different pixel positions A do not overlap. Note that it is possible to set the error distribution ratio evenly (in this case, 1/4), to perform weighting on the diffusion direction, or to vary the error distribution ratio randomly.

Figure 10:
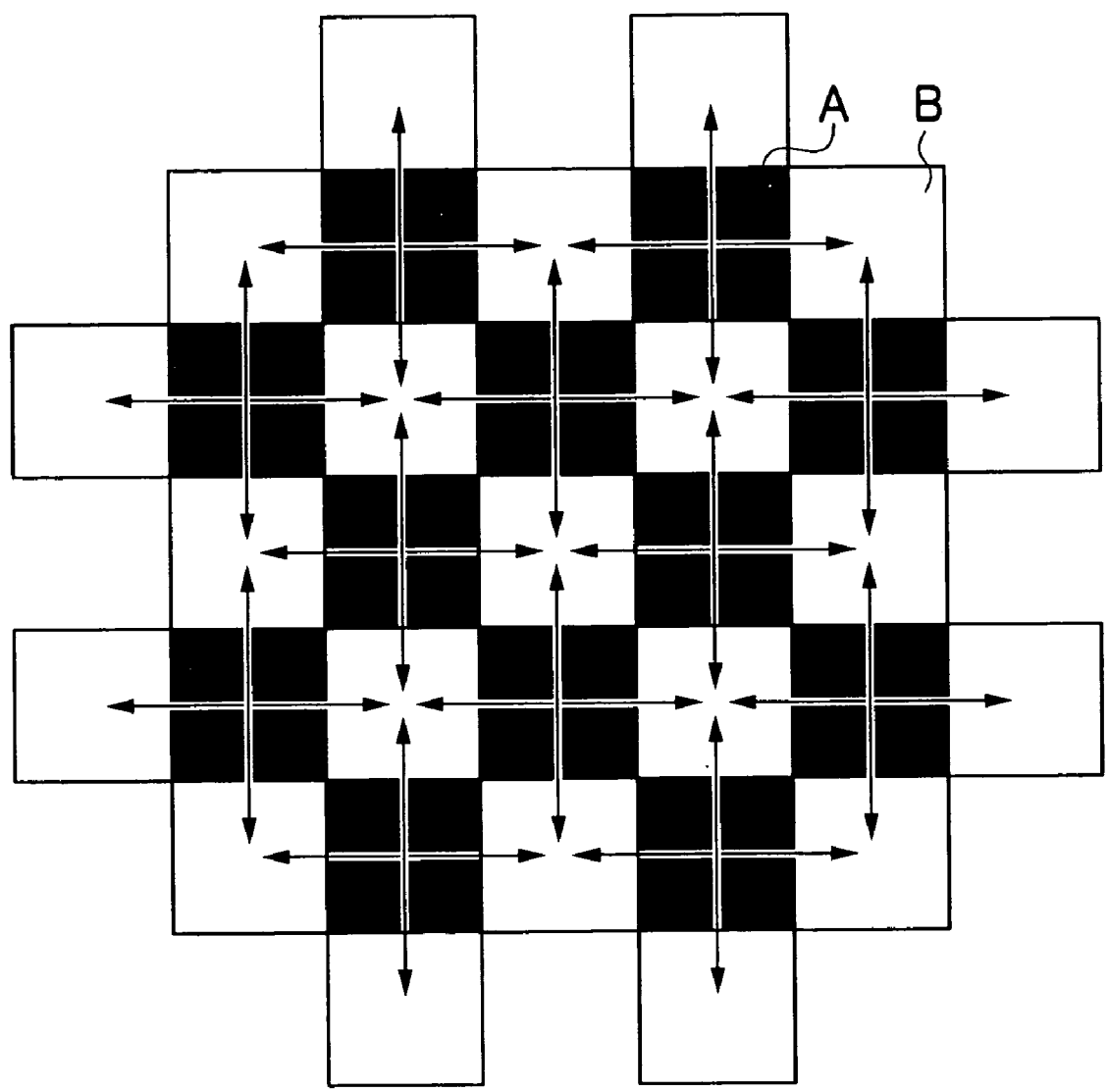
FIG. 10 is a pattern diagram showing a second example of pixel grouping and a quantization error diffusion pattern.
Figure 11:
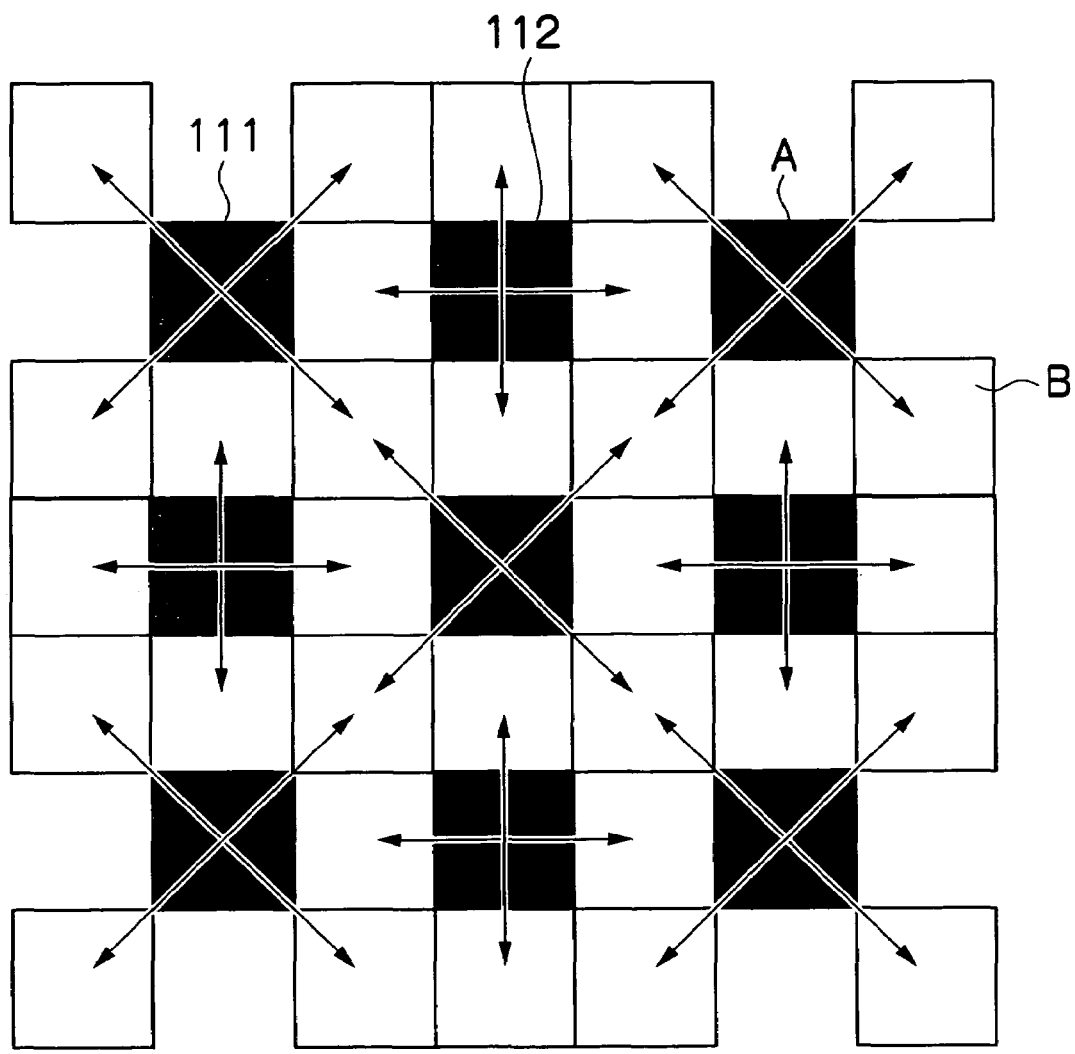
FIG. 11 is a pattern diagram showing a third example of pixel grouping and a quantization error diffusion pattern.
Figure 12:
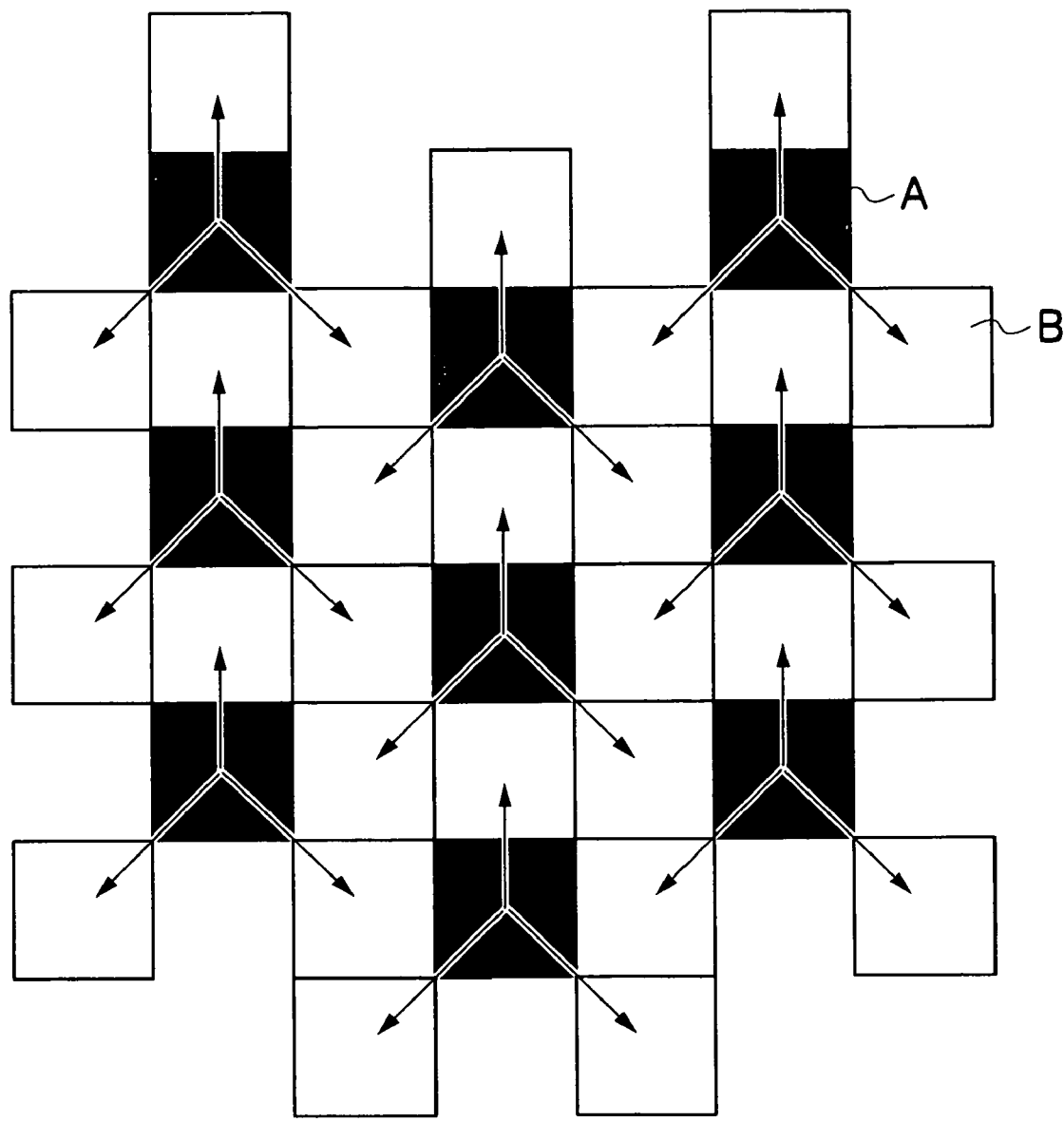
FIG. 12 is a pattern diagram showing a fourth example of pixel grouping and a quantization error diffusion pattern.

The distribution pattern and error diffusion pattern of the pixel positions A are not limited to the example in FIG. 9, and may be modified in various ways. FIGS. 10 to 12 show other examples.

In the example in FIG. 10, the pixel positions A and pixel positions B are distributed in a checkerboard pattern. The quantization error of each pixel position A is diffused to the four adjacent pixel positions B to the top, bottom, left, and right, and hence the errors distributed to one pixel position B from the four pixel positions A to the top, bottom, left, and right are added to each other in succession.

In the example in FIG. 11, a distribution pattern in which the pixel position A and the pixel position B are disposed alternately in the row direction is repeated on every second row such that the pixel positions A are provided in every second pixel in the column direction and row direction. Two diffusion patterns are set in regard to the diffusion method for the errors from the pixel positions A. In the first pattern, the error is diffused in four diagonal directions, i.e. to the upper right, lower right, upper left, and lower left, and in the second pattern, the error is diffused in four directions to the top, bottom, left, and right. The pixel positions (for example, the reference numeral 111 in FIG. 11) belonging to the first pattern and the pixel positions (for example, the reference numeral 112 in FIG. 11) belonging to the second pattern are provided alternately in the row direction and column direction.

In the example in FIG. 12, the distribution pattern of FIG. 11 is modified such that the pixel positions A arranged in the column direction are offset from each other at a pitch of one pixel in the column direction. Further, the error generated by quantization of each pixel position A is diffused to the adjacent pixel positions B in three directions, to the top, lower right, and lower left, so that the diffusion destinations do not overlap.

Figure 13A:
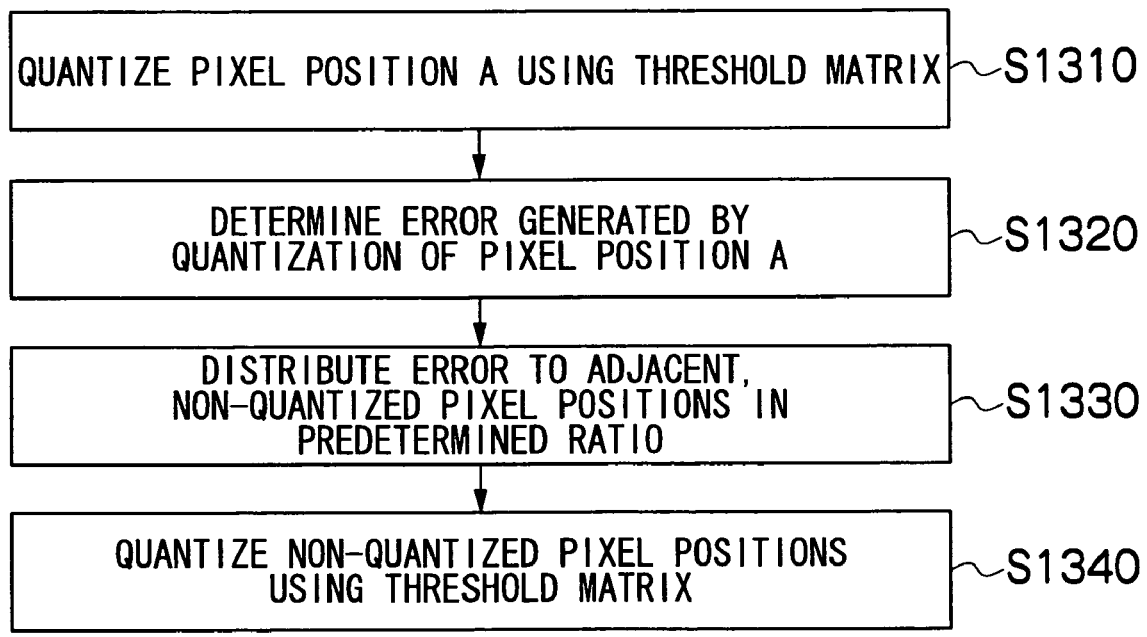
FIG. 13A is a flowchart showing a quantization processing procedure.

Quantization of the pixels arranged in the patterns shown in FIGS. 9 to 12 is performed according to the following procedure. FIG. 13A is a flowchart showing a quantization processing procedure.

(Procedure 1): First, the pixel position A is quantized using a threshold matrix (step S1310). The threshold matrix is a matrix defining thresholds which serve as determination references for determining whether or not a dot is to be placed in a pixel position (x, y). The pixel value of the pixel position (x, y) is compared to the threshold which corresponds to that position, and if the pixel value is greater than the threshold, a dot is placed in that position (x, y), whereas no dot is placed in the position if the pixel value is smaller than the threshold. Note that in cases where the grayscale value and threshold are equal, a decision may be made in advance as to whether or not to place a dot.

The threshold matrix used here preferably has a blue noise characteristic. A blue noise mask is designed to provide a visually pleasing dot arrangement in relation to the direct current components of an image. At this time, quantization noise (noise generated when the number of tones decreases) is concentrated to a high spatial frequency side that is hard to recognize. Hence when the image components of the inputted image are mainly low spatial frequency components, the blue noise characteristic enables a high image quality quantization result.

However, in the case of an image containing mainly high spatial frequency components, the image components and the quantization noise draw close, leading to a noisy quantization result. By distributing the quantization error to peripheral pixels as shown in FIGS. 9 to 12 at this time, the image quality can be improved.

(Procedure 2): Next, the error generated by quantization of the pixel position A, performed in the aforementioned step S1310, is determined (step S1320). More specifically, the difference between the quantization result and the pixel value is calculated as the error.

(Procedure 3): The error determined in this manner is then distributed to adjacent, non-quantized pixel positions B (step S1330). The pixel positions of the error diffusion destinations (distribution destinations) and the error distribution ratio are selected appropriately, as described in relation to FIGS. 9 to 12. The pixel value of the non-quantized pixel positions B is corrected (error-corrected) to a value which is the sum of the original grayscale value and the value of the error distributed from the pixel position A.

(Procedure 4): The non-quantized pixel positions B subjected to error correction in the above step S1330 are quantized using a threshold matrix (step S1340). Note that during quantization of the pixel positions B, errors are not calculated, and hence errors generated by quantization of the pixel positions B are not diffused to peripheral pixels.

Figure 13B:
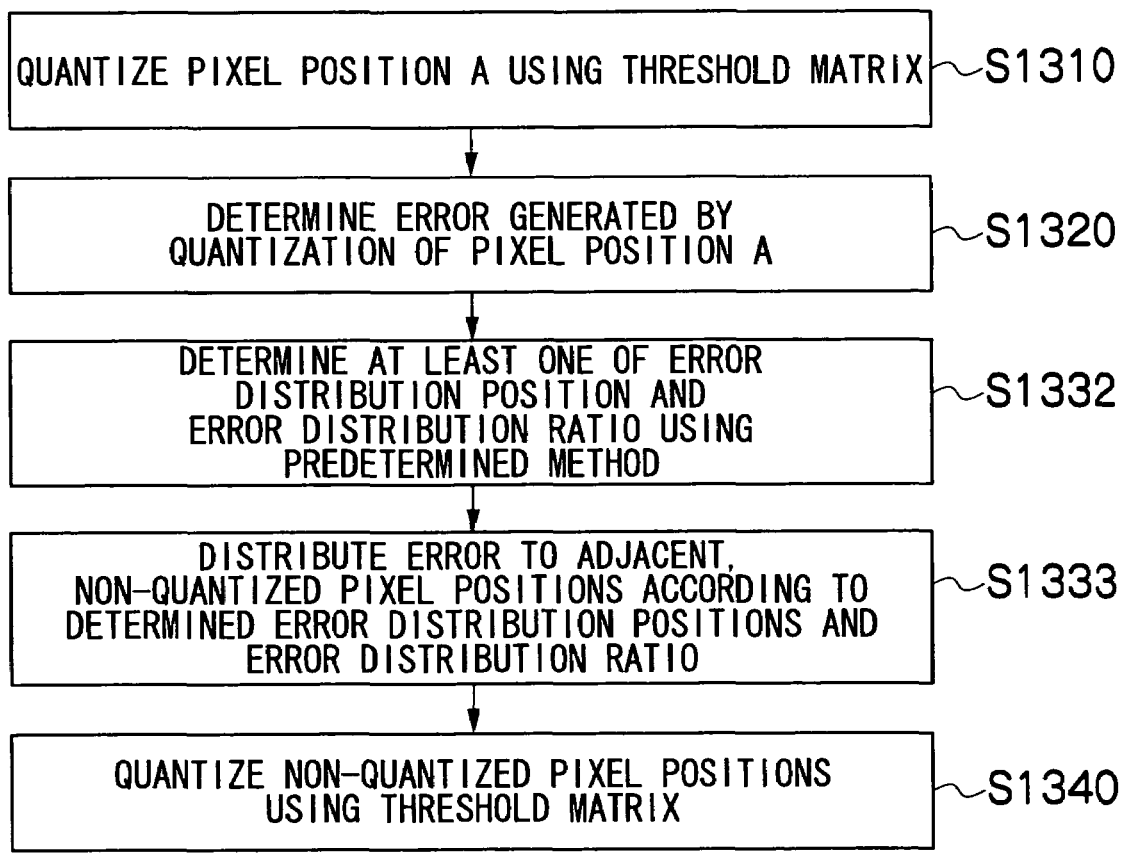
FIG. 13B is a flowchart showing another example of a quantization processing procedure.

FIG. 13B is a flowchart showing in greater detail the steps of the error distribution control process described in the step S1330 of FIG. 13A. In FIG. 13A, identical step numbers have been allocated to identical or similar steps, and description thereof has been omitted.

As shown in FIG. 13B, after determining the quantization error in the step S1320, the routine advances to a step S1332. In the step S1332, at least one of the error distribution position and the error distribution ratio is determined using a predetermined method. The routine then advances to a step S1333, where the error is distributed to adjacent non-quantized pixel positions in accordance with the error distribution positions and error distribution determined in the step S1332 (step S1333). After the step S1333, the routine advances to the step S1340, where the non-quantized pixel positions B subjected to error correction in the above step S1333 are quantized using a threshold matrix (step S1340).

As described above, according to the quantization processing of the present embodiment, the pixel positions B, which are not subjected to error calculation, and the pixel positions A, which are not subjected to error correction processing, exist side by side, and hence in comparison with a conventional method, the calculation load required for quantization is reduced greatly. Furthermore, since this processing is not sequential processing, parallel processing can be constructed easily. Moreover, the errors generated during quantization are taken into account in relation to a part of the pixel positions (the pixel position A belonging to the first group), and hence, unlike a simple conventional threshold matrix method, the average value of the inputted image is saved. This produces high image quality and eliminates dot delay, which is a disadvantage of conventional error diffusion methods.

A brief description of the term "blue noise characteristic" will now be provided. A dot placement is obtained as a result of digital halftoning, and a method proposed by Robert Ulichney ("Digital Halftoning"; published by The MIT Press) is typically used as a method of evaluating the dot placement (dot arrangement).

Figure 14:
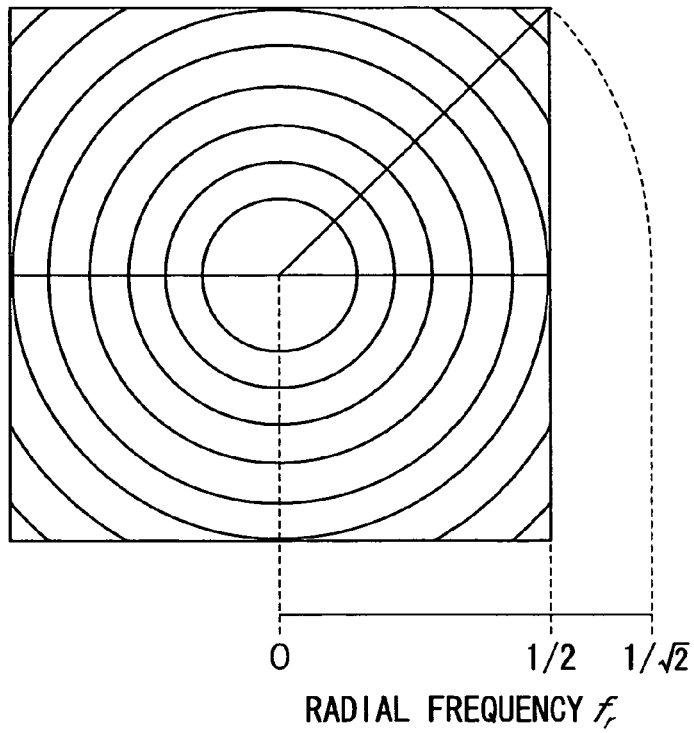
FIG. 14 is a view showing a coordinate system for calculating a two-dimensional power spectrum.

More specifically, the two-dimensional power spectrum of the dot placement is converted to radial coordinates, as in FIG. 14, and the index corresponding to the average and dispersion of the spectrum at all angles is calculated for the spatial frequency fr corresponding to the radius of the radial coordinates.

The radially averaged power spectrum (R.A.P.S.) is expressed by the following equation (1):

$$P_r(f_r) = \frac{1}{N_r(f_r)} \sum_{i=1}^{N_r(f_r)} \bar{P}(f). \qquad (1)$$

The anisotropy is expressed by the following equation (2):

$$s^2(f_r) = \frac{1}{N_r(f_r) - 1} \sum_{i=1}^{N_r(f_r)} \left(\bar{P}(f) - P_r(f_r)\right)^2 \qquad (2)$$

$$\text{anisotropy} = \frac{s^2(f_r)}{P_r^2(f_r)}.$$

The radially averaged power spectrum (R.A.P.S.) is a spectrum related to the visibility of the dot placement, and the dispersive spectrum is a spectrum related to the anisotropy of the dot placement.

Figure 15:
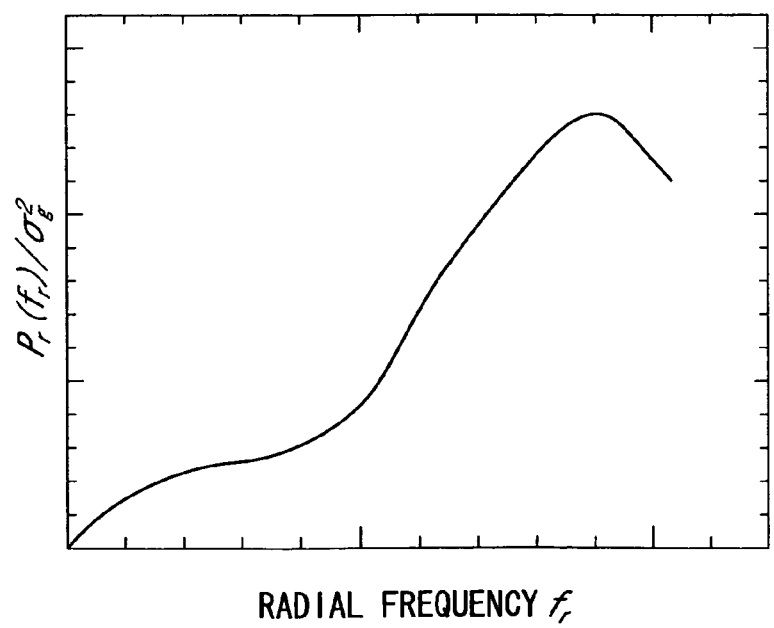
FIG. 15 is a graph showing an example of an average index of a polar coordinate power spectrum (R.A.P.S) calculated under certain conditions.

An example of R.A.P.S. calculated under certain preferable conditions is shown in FIG. 15. In FIG. 15, $\sigma_g$ is expressed by the following equation (3):

$$\sigma_g = g(1-g), \qquad (3)$$

where g is the normalized inputted value, and $0 \leq g \leq 1$.

Figure 16:
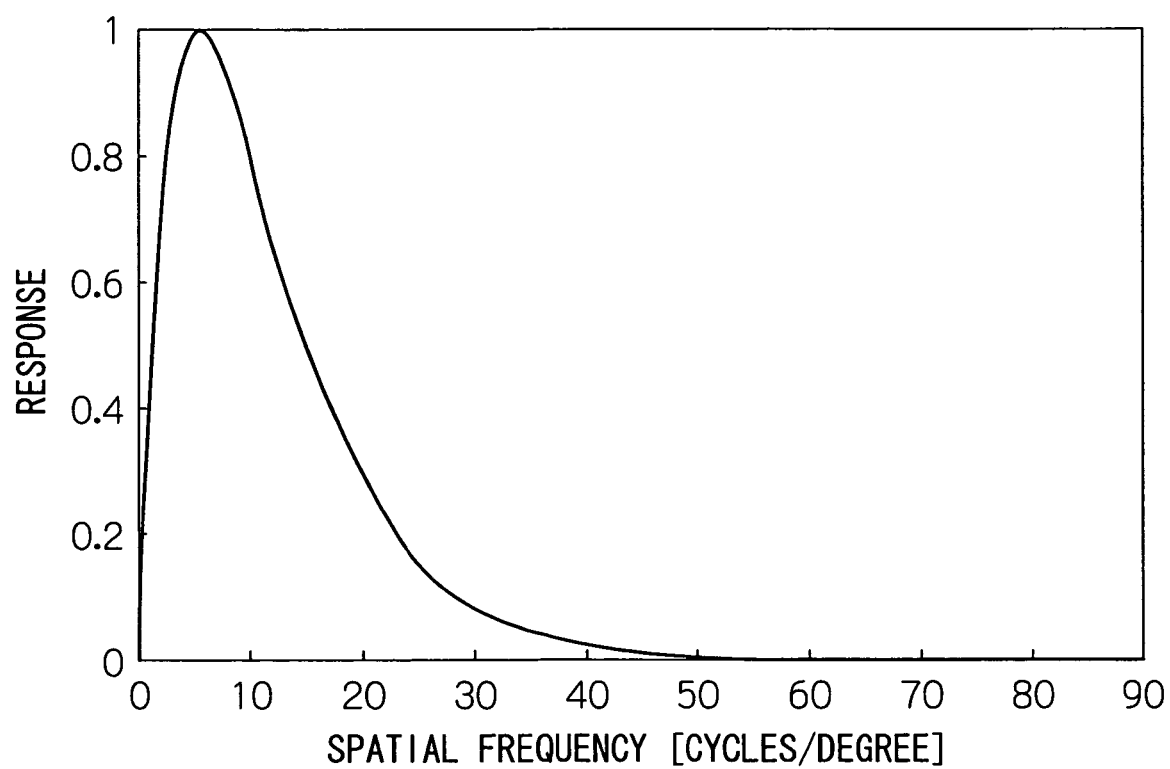
FIG. 16 is a graph showing the visual characteristic of a human eye (VTF)

In the graph shown in FIG. 15, the visibility characteristic is not taken into account. However, by taking into account (multiplying) the well-known visibility characteristic (VTF) shown in FIG. 16, the overall energy is suppressed to a low level. Note that the VTF used when calculating the R.A.P.S. and anisotropy is not limited to that proposed by Dooly and Shaw, and another well-known VTF may be used.

Figure 17:
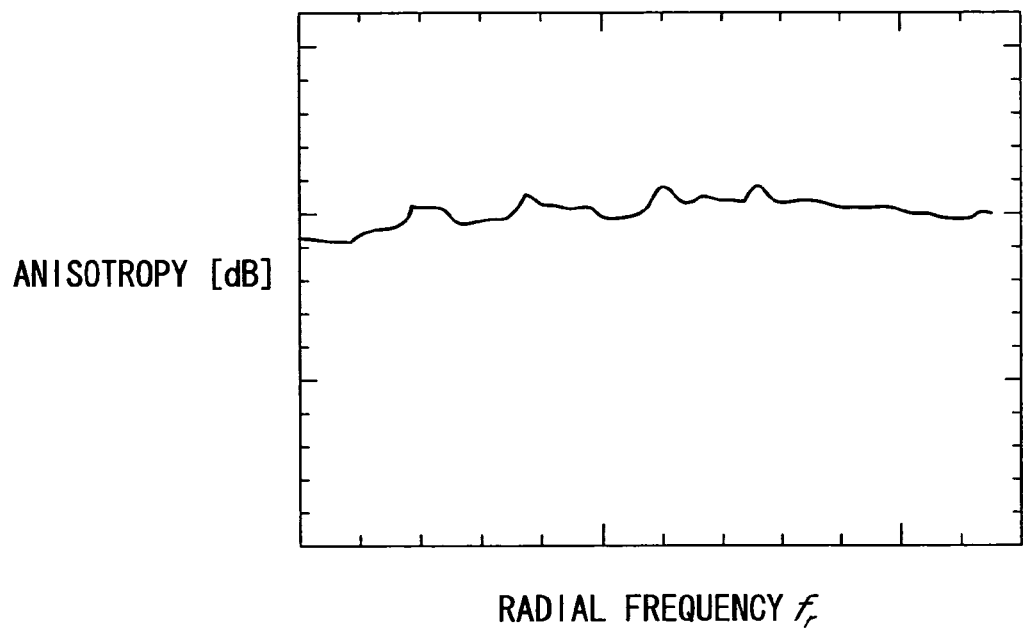
FIG. 17 is a graph showing an example of the distribution index (anisotropy) of a polar coordinate power spectrum calculated under certain conditions.

FIG. 17 shows an example of the anisotropy calculated under certain conditions. According to Robert Ulichney, the dot anisotropy ceases to be noticeable when the anisotropy is −10 decibels (dB) or less.

Figure 18:
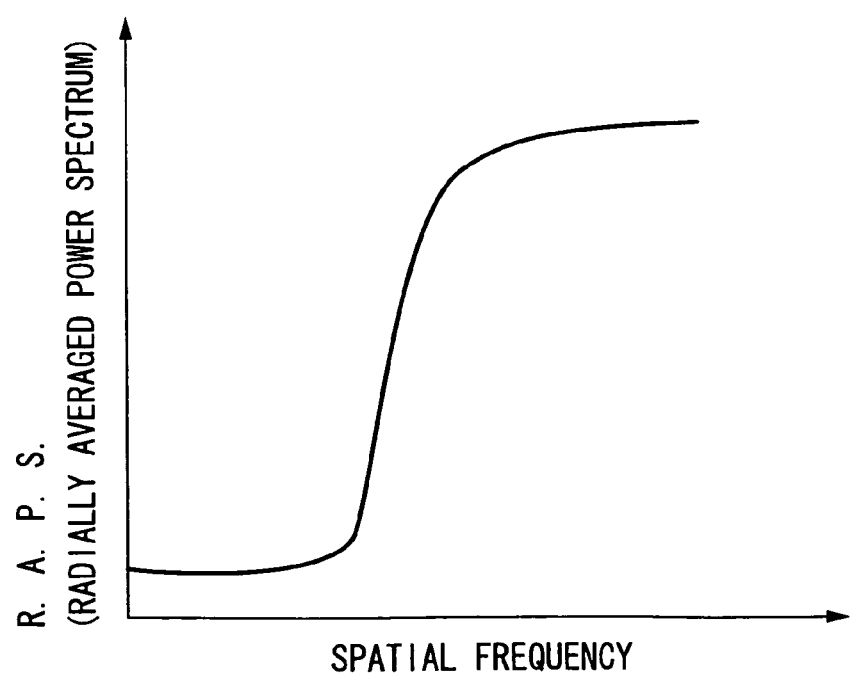
FIG. 18 is a graph of a typical R.A.P.S. of a dot distribution having a blue noise characteristic.

When a dot arrangement is evaluated using the method described in FIGS. 14 to 17, the R.A.P.S. is small in the low spatial frequency region, reaches a peak at medium spatial frequency, and stabilizes at high spatial frequency. A dot placement having an anisotropy of −10 decibels (dB) or less possesses the "blue noise characteristic", and when the dot arrangement determined by the threshold matrix has the blue noise characteristic, the threshold matrix is referred to as a blue noise mask. Note that although FIG. 15 also illustrates the blue noise characteristic in outline, an example of a classic graph is shown in FIG. 18.

Next, an example of the error distribution method described in "Procedure 3" step S1330 of FIG. 13A) will be described. Constitutions such as the following may be added to the error distribution method of "Procedure 3".

(Additional constitution 1): The error distribution ratio to the adjacent non-quantized pixel positions B may be randomized. In so doing, unique patterns (unevenness) which adversely affect the image quality can be suppressed.

Figure 13C:
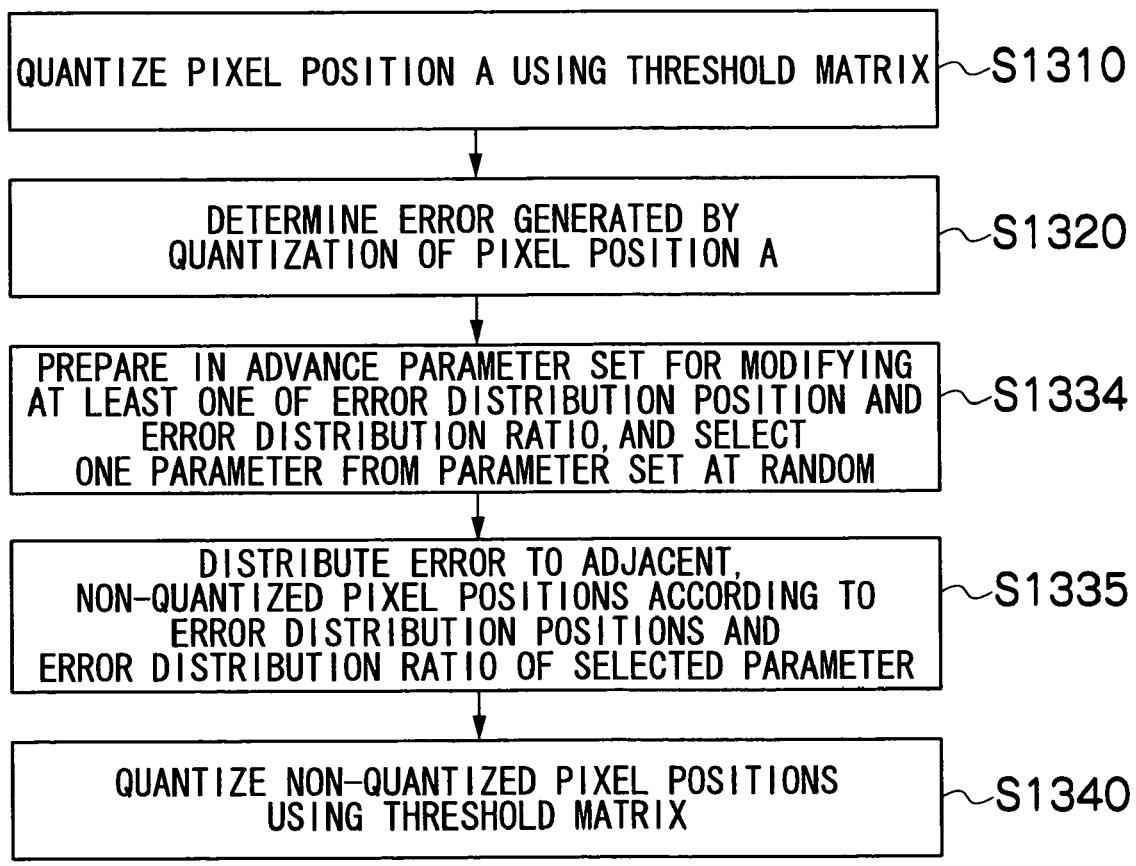
FIG. 13C is a flowchart showing another example of a quantization processing procedure.

FIG. 13C is a flowchart of this constitution. In FIG. 13C, identical step numbers to those of FIG. 13A have been allocated to identical or similar steps, and description thereof has been omitted. As shown in FIG. 13C, after determining the quantization error in the step S1320, the routine advances to a step S1334. In the step S1334, a set of parameters for modifying at least one of the error distribution position and the error distribution is prepared in advance, and one of these parameters is selected at random from the parameter set. The routine then advances to a step S1335, where the error is distributed to adjacent non-quantized pixel positions in accordance with the error distribution positions and error distribution of the parameter selected in the step S1334 (step S1335). After the step S1335, the routine advances to the step S1340, where the non-quantized pixel positions B subjected to error correction in the above step S1335 are quantized using a threshold matrix (step S1340).

(Additional constitution 2): The error distribution is controlled according to the gradient of the peripheral pixels (the grayscale value gradient). For example, the difference between the grayscale values of adjacent pixels is calculated, and as the extent of the difference (gradient) increases, error diffusion in a perpendicular direction to the gradient direction is promoted, and error diffusion in the gradient direction is suppressed. In so doing, edge reproduction is enhanced.

FIG. 13D is a flowchart of this constitution. In FIG. 13D, identical step numbers to those of FIG. 13A have been allocated to identical or similar steps, and description thereof has been omitted. As shown in FIG. 13D, while determining the quantization error in the step S1320, the grayscale value gradients in the vicinity of the pixel positions A are determined (step S1322). The routine then advances to a step S1336. In the step S1336, a set of parameters for modifying at least one of the error distribution position and the error distribution corresponding to the grayscale value gradient is prepared in advance, and one of these parameters is selected from the parameter set on the basis of the grayscale value gradient calculated in the step S1322.

The routine then advances to a step S1337, where the error is distributed to adjacent non-quantized pixel positions in accordance with the error distribution positions and error distribution of the parameter selected in the step S1336 (step S1337). After the step S1337, the routine advances to the step S1340, where the non-quantized pixel positions B subjected to error correction in the above step S1337 are quantized using a threshold matrix (step S1340).

(Additional constitution 3): The error distribution is controlled according to the spatial frequency characteristic of the peripheral pixels. For example, error diffusion is steadily suppressed as high spatial frequency component becomes smaller. In so doing, the blue noise characteristic described above can be put to active use. Further, the error diffusion destinations may be modified in accordance with the directivity of the spatial frequency components. For example, the spatial frequency components in the error diffusion direction are determined, and error diffusion in that direction is controlled.

FIG. 13E is a flowchart of this constitution. In FIG. 13E, identical step numbers to those of FIG. 13A have been allocated to identical or similar steps, and description thereof has been omitted. As shown in FIG. 13E, while determining the quantization error in the step S1320, the spatial frequency characteristic in the vicinity of the pixel position A is determined (step S1324). The routine then advances to a step S1338. In the step S1338, a set of parameters for modifying at least one of the error distribution position and the error distribution corresponding to the spatial frequency characteristic is prepared in advance, and one of these parameters is selected from the parameter set on the basis of the spatial frequency characteristic calculated in the step S1324.

The routine then advances to a step S1339, where the error is distributed to adjacent non-quantized pixel positions in accordance with the error distribution positions and error distribution of the parameter selected in the step S1338 (step S1339). After the step S1339, the routine advances to the step S1340, where the non-quantized pixel positions B subjected to error correction in the above step S1339 are quantized using a threshold matrix (step S1340).

(Additional constitution 4): During color processing, the size of the threshold matrix may be varied according to the color, or the pixel positions A from which errors are diffused and the pixel positions B from which errors are not diffused may be varied according to color. Particularly in the case of visually striking colors (such as cyan and magenta), the pixel positions A, B are preferably varied between the colors. Alternatively, the error diffusion pattern (FIGS. 9 to 12 and so on) may be varied according to color. More specifically, an error diffusion pattern such as that of FIG. 10 is used for visually striking colors such as cyan and magenta, and an error diffusion pattern such as that of FIG. 9 is used for yellow, which is not visually striking. By modifying quantization processing for each color in this manner, interference between the colors can be reduced.

(Additional constitution 5): In contrast to the "additional constitution 4" described above, during color processing the plurality of colors may be gathered together and processed at once using a common threshold matrix and a common error diffusion pattern.

In an image having two or more signals for each pixel, such as RGB signals, it is possible to subject the RGB signals of a single pixel to quantization processing simultaneously, rather than subjecting the R image, G image, and B image to quantization processing individually (for each color plane). This process is known as vector quantization. When quantization processing is performed individually for each color, it is difficult to control the quantization results among the RGB colors (dot overlap), but when the RGB signals of one pixel are quantized simultaneously, the quantization results among the RGB colors (dot overlap) can be controlled easily.

The advantages of applying vector quantization to this embodiment of the present invention are as follows.

When dot overlap is taken into account during error diffusion processing, the calculation load becomes extremely large, and it is not always possible to obtain the desired result with accuracy (see Japanese Patent Application Publication No. 8-279920).

Meanwhile, with threshold matrix processing, the desired result (desired dot overlap) is obtained (Reference Materials: "Modified Jointly Blue Noise Mask Approach Using S-CIEL AB Color Difference", J Imaging Sci Technol, Vol. 46, No. 6; pp. 543-551 (200111-200212) or "Properties of Jointly-Blue Noise Masks and Applications to Color Halftoning", J Imaging Sci Technol, Vol. 44, No. 4; pp. 360-370), but when the spatial frequency components of the image are medium or high spatial frequency, errors are not taken into account, and hence the image quality suffers.

By diffusing errors partially, as in this embodiment of the present invention, on a threshold matrix taking dot overlap into account (see the aforementioned reference materials for a method of creating the threshold matrix), high image quality processing taking errors into account can be performed even when the spatial frequency components of the image are medium or high spatial frequency.

As shown in the example in FIG. 10, the image quality improves as the number of pixels for which the error is calculated increases, but as a result, the error calculation load also increases. Therefore, the distribution pattern of the pixel positions A, B and the error diffusion pattern (see FIGS. 9 to 12, for example) are preferably selected so as to achieve a balance between the image quality and the calculation load.

Figure 19A:
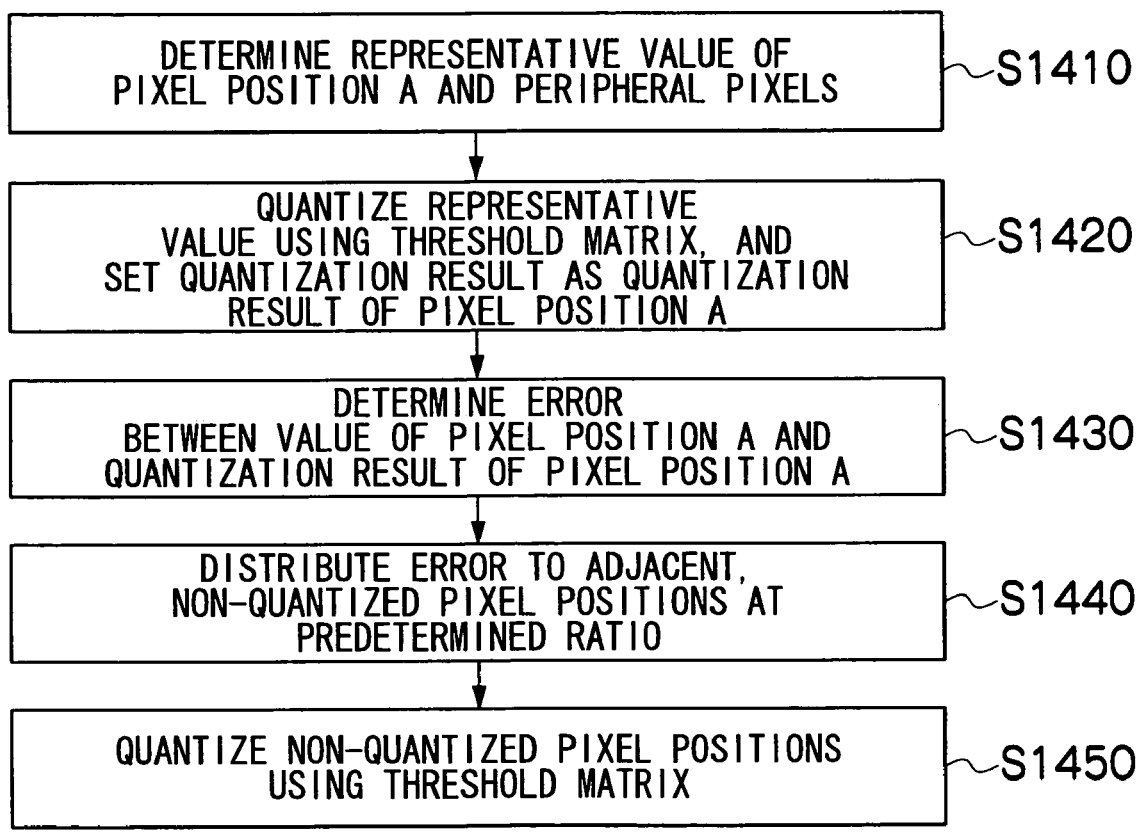
FIG. 19A is a flowchart showing another example of a quantization processing procedure.

An aspect is also possible in which quantization processing is performed according to the flowchart shown in FIG. 19A rather than the flowchart shown in FIG. 13A.

(Procedure 1): First, a representative value of the pixel position A and its peripheral pixels is determined (step S1410). For example, the representative value is calculated in a 3×3 pixel range comprising the eight pixels adjacent to and on the periphery of the subject pixel. An average value, a central value, or another value may be used as the representative value.

(Procedure 2): Next, the representative value is quantized using a threshold matrix, and the quantization result is set as the quantization result of the pixel position A (step S1420). Similarly to FIGS. 13A to 13E, the threshold matrix preferably possesses a blue noise characteristic.

(Procedure 3): The error between the grayscale value of the pixel position A and the quantization result of the pixel position A produced in the above step S1420 is then determined (step S1430).

(Procedure 4): The error determined in this manner is then distributed to the adjacent non-quantized pixel positions B (step S1440).

(Procedure 5): The non-quantized pixel positions B subjected to error correction in the above step S1440 are then quantized using a threshold matrix (step S1450). Quantization of the pixel positions B is similar to that in the flowcharts of FIGS. 13A to 13E in that error calculation is not performed and errors generated by quantization of the pixel positions B are not diffused to peripheral pixels.

FIGS. 19B to 19G show modified embodiments of the flowchart shown in FIG. 19A. In these flowcharts, identical step numbers are allocated to identical or similar steps to those of FIG. 19A, and description thereof has been omitted.

Figure 19B:
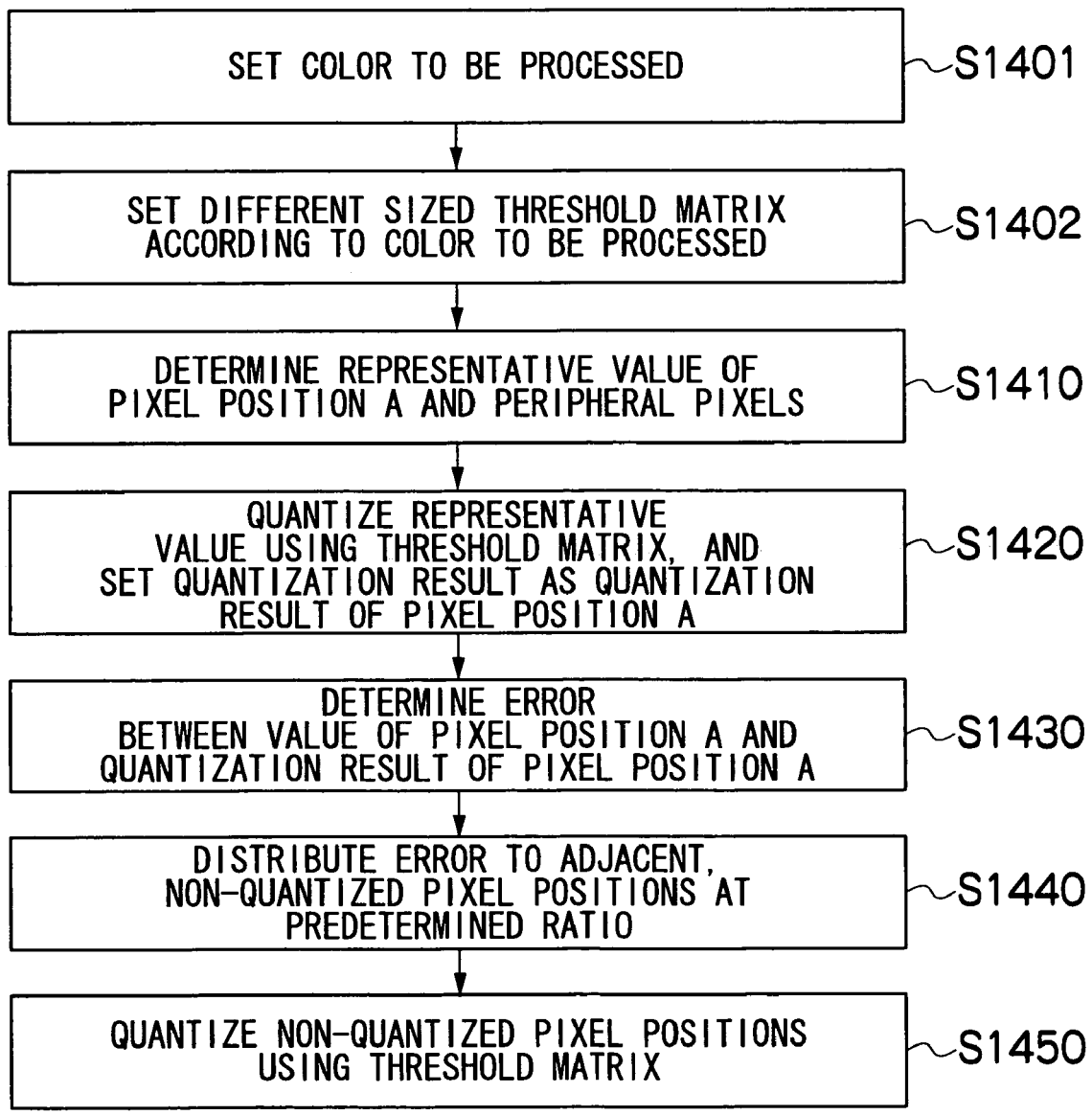
FIG. 19B is a flowchart showing another example of a quantization processing procedure.

FIG. 19B is a flowchart showing an aspect in which the size of the threshold matrix is varied according to color. As shown in the flowchart, first the color to be processed is set (step S1401), and then a threshold matrix, which differs in size according to the color to be processed, is set (step S1402). Next, a representative value of the pixel position A and its peripheral pixels is determined (step S1410). The representative value determined in this manner is quantized using the threshold matrix set in the step S1402, and the quantization result is set as the quantization result of the pixel position A (step S1420). The subsequent processing (steps S1430 to S1450) is similar to that of FIG. 19A. Note that the threshold matrix used in the quantization of the step S1450 shown in FIG. 19B is the threshold matrix set in the step S1402.

Figure 19C:
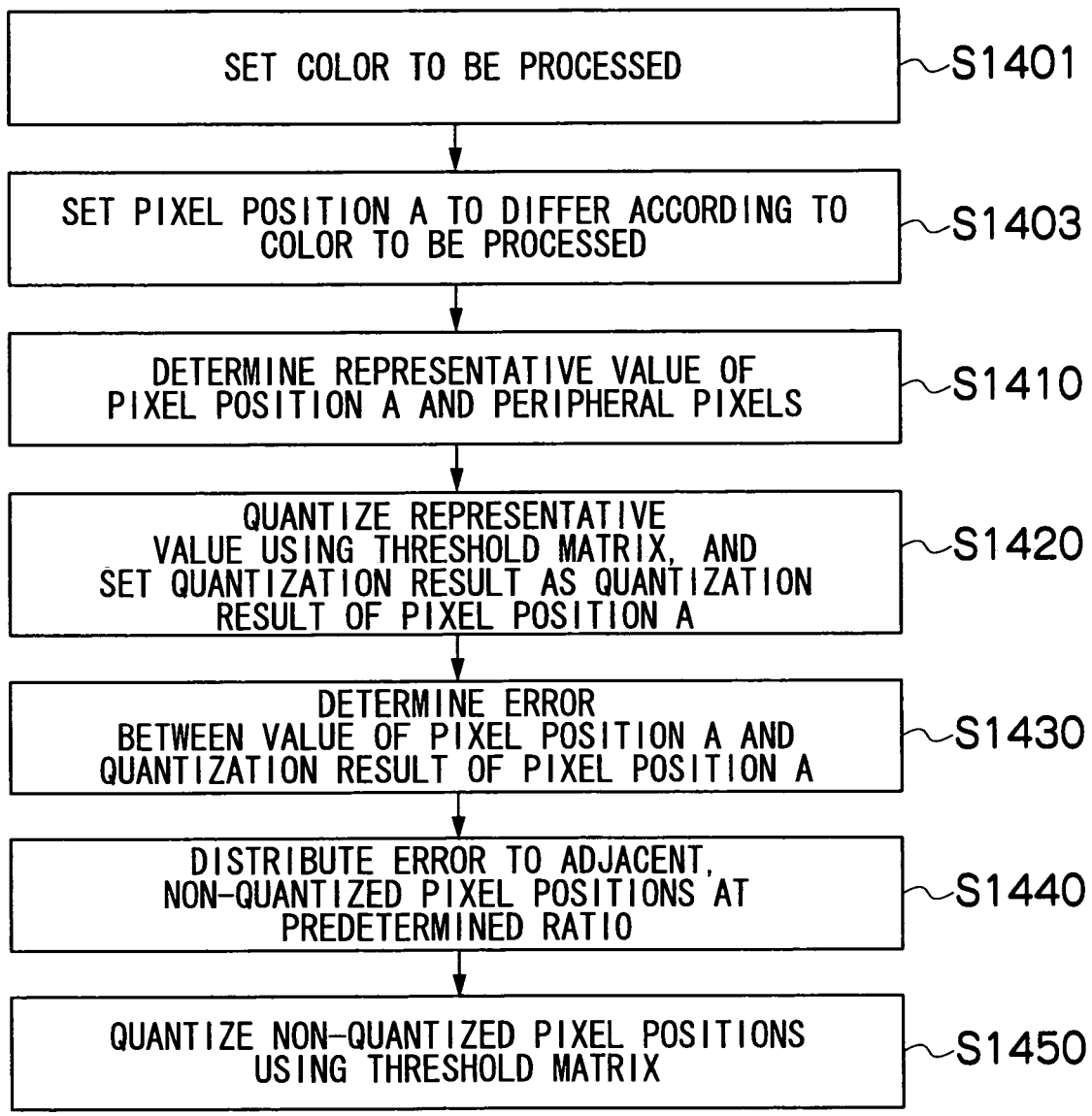
FIG. 19C is a flowchart showing another example of a quantization processing procedure.

FIG. 19C is a flowchart showing an aspect in which the positions of the pixel positions A are varied according to color. As shown in the flowchart, first the color to be processed is set (step S1401), and then the pixel positions A are set to differ according to the color to be processed (step S1403). Next, a representative value of the pixel position A and its peripheral pixels is determined (step S1410). The representative value determined in this manner is quantized using a threshold matrix, and the quantization result is set as the quantization result of the pixel position A (step S1420). The subsequent processing (steps S1430 to S1450) is similar to that of FIG. 19A.

Figure 19D:
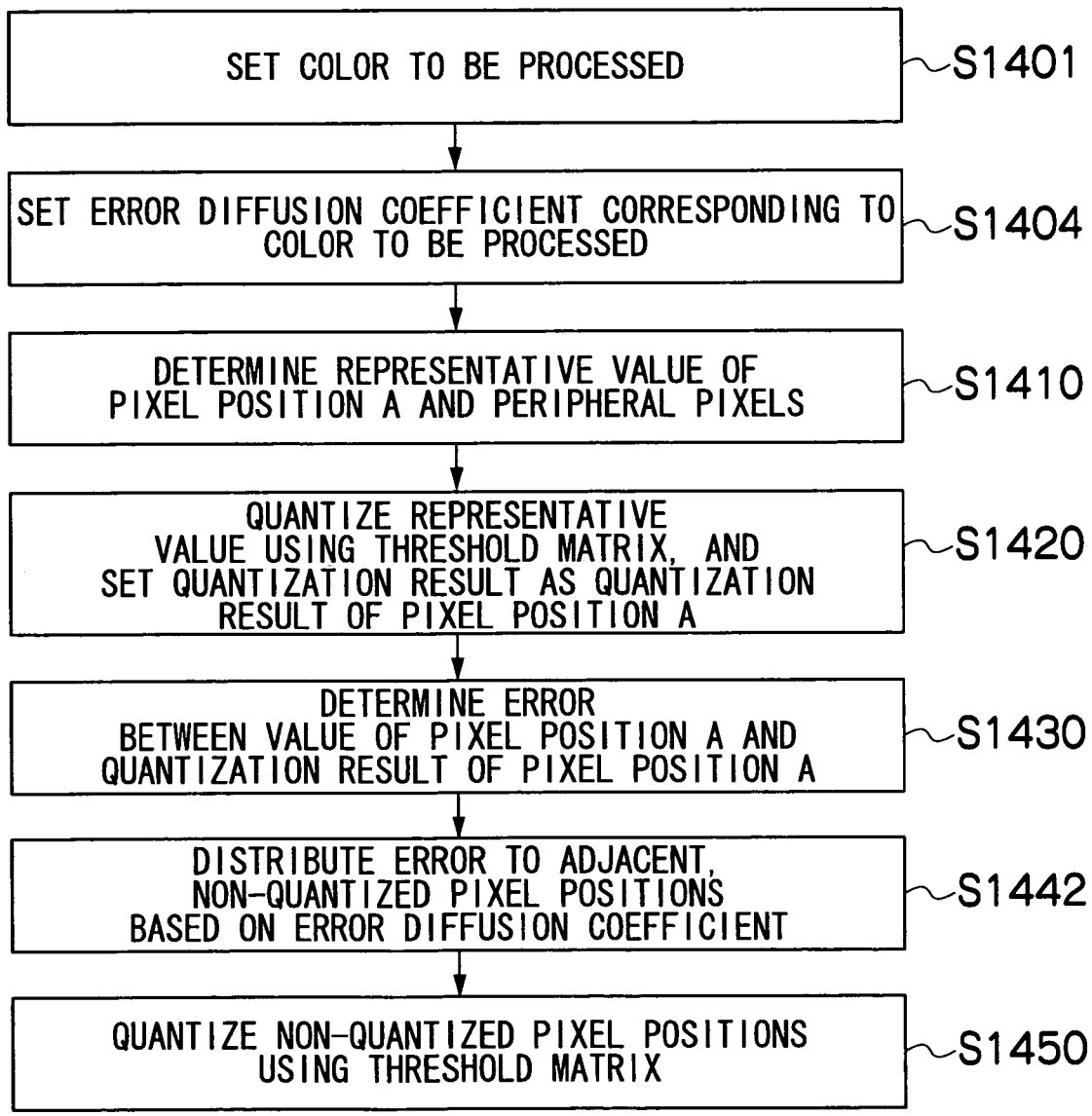
FIG. 19D is a flowchart showing another example of a quantization processing procedure.

FIG. 19D is a flowchart showing an aspect in which the error diffusion method is varied according to color. As shown in the flowchart, first the color to be processed is set (step S1401), and then an error diffusion coefficient corresponding to the color to be processed is set (step S1404). Next, a representative value of the pixel position A and its peripheral pixels is determined (step S1410). The representative value determined in this manner is quantized using a threshold matrix, and the quantization result is set as the quantization result of the pixel position A (step S1420). The error determined in the step S1430 is then distributed to adjacent non-quantized pixel positions on the basis of this error diffusion coefficient (the coefficient set in the step S1404) (step S1442). The non-quantized pixel positions B subjected to error correction in the step S1442 are then quantized using a threshold matrix (step S1450).

Figure 19E:
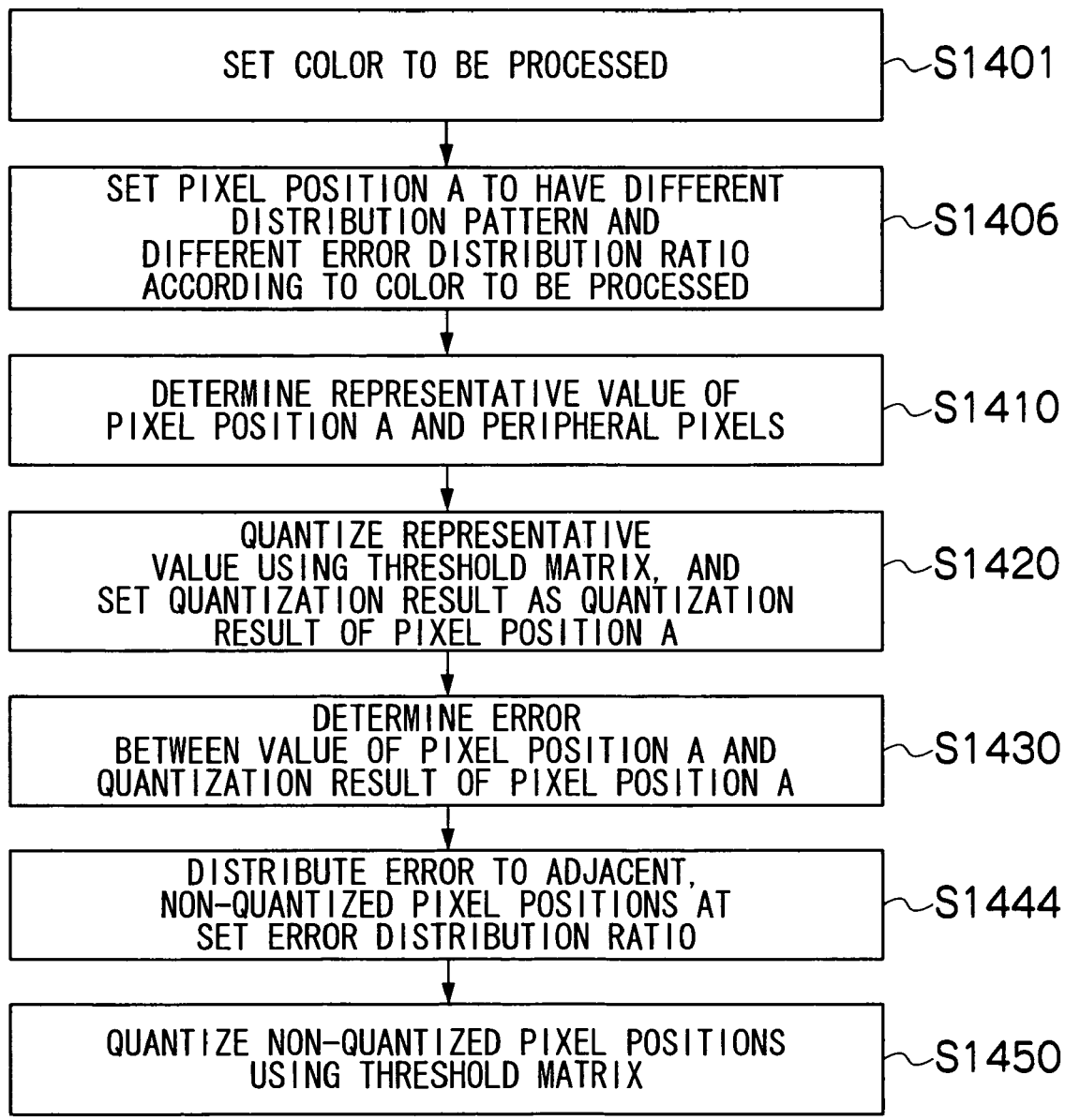
FIG. 19E is a flowchart showing another example of a quantization processing procedure.

FIG. 19E is a flowchart showing another aspect in which the error diffusion method is varied according to color. As shown in the flowchart, first the color to be processed is set (step S1401), and then the pixel positions A are set such that the arrangement pattern of the pixel positions A and the error distribution differ according to the color to be processed (step S1406). Next, representative values of the pixel positions A set in the step S1406 and their peripheral pixels are determined (step S1410). The representative values determined in this manner are quantized using a threshold matrix, and the quantization results are set as the quantization results of the pixel positions A (step S1420). The error determined in the step S1430 is then distributed to adjacent non-quantized pixel positions in the set error distribution (in accordance with the error distribution method set in the step S1406) (step S1444). The non-quantized pixel positions B subjected to error correction in the step S1444 are then quantized using a threshold matrix (step S1450).

Figure 19F:
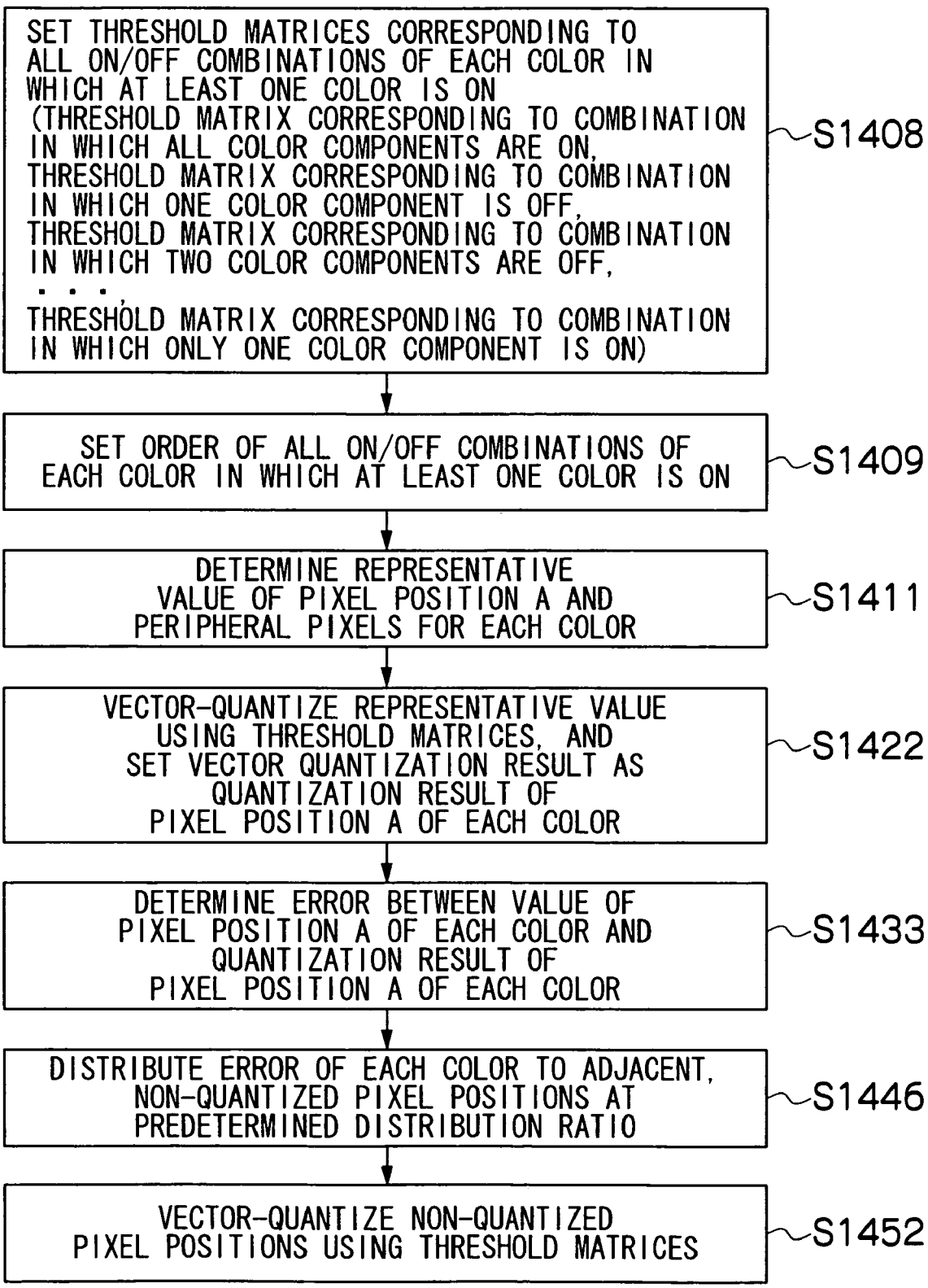
FIG. 19F is a flowchart showing another example of a quantization processing procedure.

FIG. 19F is a flowchart showing an aspect in which the plurality of color signals of one pixel are gathered together and subjected to vector quantization processing. As shown in the flowchart, first threshold matrices corresponding to all ON/OFF combinations of each color, in which at least one color is ON, are set (step S1408). More specifically, a threshold matrix corresponding to a combination in which the color components of the plurality of colors are all ON, a threshold matrix corresponding to a combination in which one color component is OFF, a threshold matrix corresponding to a combination in which two color components are OFF, . . . , and a threshold matrix corresponding to a combination in which only one color component is ON, are set.

Next, an order is set for all of the ON/OFF combinations of each color in which at least one color is ON (step S1409). A representative value of the pixel position A and its peripheral pixels is then determined for each color (step S1411). The representative values determined in the step S1411 are then vector-quantized using the aforementioned threshold matrices (the threshold matrices set in the step S1408), whereupon the vector quantization results are set as the quantization result of the pixel position A of each color (step S1422).

The error between the value of the pixel position A for each color and the quantization result of the pixel position A for each color determined in the step S1422 is then determined (step S1433), whereupon the error of each color is distributed to adjacent non-quantized pixel positions according to a predetermined distribution method (step S1446). The non-quantized pixel positions B subjected to error correction in the step S1446 are then quantized using a threshold matrix (step S1452).

FIG. 19G shows a flowchart of the vector quantization processing of the steps S1442 and S1452. As shown in the flowchart, vector quantization processing is executed in accordance with the aforementioned order of ON/OFF combinations (the order set in the step S1409 of FIG. 19F) (step S2012). A value obtained by adding the value of each ON color in the ON/OFF combination corresponding to the order is determined (step S2014). Next, the addition result is compared with the threshold matrix corresponding to the combination, and a determination is made as to whether or not the addition result satisfies a predetermined condition (step S2016).

When the predetermined condition is satisfied in the step S2016, the routine advances to a step S2018, where the ON/OFF condition of the combination is set as the quantization result. If, on the other hand, the predetermined condition is not satisfied in the step S2016, the routine advances to a step S2020, where a determination is made as to the existence of unprocessed combinations. If an unprocessed combination exists, the processing subject is switched to the next ON/OFF combination following the combination order (the order set in the step S1409) (step S2022), whereupon the routine returns to the step S2014.

If no unprocessed combinations exist in the determination of the step S2020, "all colors OFF" is set as the quantization result (step S2024).

Once the quantization result has been fixed in the step S2018 or the step S2024, the routine passes out of the vector quantization processing subroutine, and returns to the flowchart in FIG. 19F.

Similarly to FIGS. 13A to 13E, when quantization is performed according to the quantization flows illustrated in FIGS. 19A to 19G, the processing involved therein is not sequential processing, and hence parallel processing can be constructed easily. Moreover, the errors generated by quantization are taken into account, and hence, unlike a conventional threshold matrix method, the average value of the inputted image is saved. This produces high image quality and eliminates dot delay, which is a disadvantage of conventional error diffusion methods.

FIG. 20 shows a constitutional example of the digital halftoning processing unit 104 which realizes the quantization processing described in FIGS. 9 to 19G The digital halftoning processing unit 104 is constituted by a group dividing unit 202, a grouping controller 204, a first quantization processing unit 206, a threshold matrix storage unit 208, an error calculation unit 210, a diffusion pattern controller 212, an error addition unit 214, and a second quantization processing unit 216. Note that each block (202 to 216) may be realized through hardware such as an electronic circuit or a signal processing circuit, or the respective functions of the blocks may be realized through software. Needless to say, the blocks may also be realized through an appropriate combination of hardware and software.

The group dividing unit 202 performs processing to divide the pixels constituting an inputted image (grayscale image)

220 into the first group and second group according to a predetermined distribution pattern such as those shown in FIGS. 9 to 12. The grouping controller 204 performs control to switch between the distribution patterns of the pixel positions A and the pixel positions B.

The first quantization processing unit 206 performs quantization using a threshold matrix on the pixel positions A belonging to the first group, from among the pixel groups divided by the group dividing unit 202. Note that when the representative value described in FIGS. 19A to 19F is determined, the representative value is calculated at the stage previous to the first quantization processing unit 206.

The threshold matrix storage unit 208 shown in FIG. 20 stores the data of the threshold matrix used in the quantization calculations. The threshold matrix preferably possesses a blue noise characteristic taking low and medium spatial frequency regions into account. A constitution is also possible in which a plurality of threshold matrices are stored and the matrices are switched as needed.

The error calculation unit 210 calculates an error generated by the quantization performed by the first quantization processing unit 206. The difference between the original pixel value and the quantization result is calculated as the error.

The diffusion pattern controller 212 sets the method of distributing the quantization error determined by the error calculation unit 210. The diffusion pattern controller 212 determines the diffusion destination pixel positions and the distribution ratio of the error in collaboration with the grouping controller 204.

The error addition unit 214 corrects the pixel value of the diffusion destination pixel positions in accordance with the diffusion destination pixel positions and the error distribution ratio to these pixel positions, which are determined by the diffusion pattern controller 212. The new pixel value (the pixel value following error correction) is obtained by adding an error correction value, obtained by applying the error distribution ratio to the error determined by the error calculation unit 210, to the pixel value of the subject pixel.

The second quantization processing unit 216 performs quantization of the non-quantized pixel positions B of the second group, which have been subjected to error correction by the error addition unit 214, using a threshold matrix. In the second quantization processing unit 216, the same threshold matrix as that of the first quantization processing unit 206 may be used, or a different threshold matrix may be used. Since error diffusion is not performed from the pixel positions quantized by the second quantization processing unit 216, error calculation is also unnecessary.

Thus a halftone image 222 is generated through a two-stage quantization process separated into groups.

In the invention described above, an inkjet recording apparatus is employed as an example of an image forming apparatus, but the scope of the present invention is not limited thereto, and the present invention may be applied to another image forming apparatus which reproduces gradation using dots, such as a thermo-autochrome (TA) printer, a sublimatic printer, or a laser printer, or various other output apparatuses such as a display apparatus.

Further, the image processing apparatus of the present invention is not limited to an aspect in which the image processing apparatus is installed in an image forming apparatus such as an inkjet recording apparatus, and may be realized by a computer. A program for realizing the image processing function described above on a computer may be recorded on a CD-ROM, a magnetic disk, or another information storage medium such that the program can be provided to a third party through the information storage medium or provided to a downloading service through a communication line such as the Internet.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing method for performing halftoning of a digital image constituted by an array of pixels having grayscale values which correspond to a content of the digital image, the method comprising the steps of:
grouping the pixels constituting the digital image into a first group and a second group in accordance with a predetermined distribution pattern without regard to the grayscale values of the pixels, the first group comprising pixels located in first preselected pixel positions, the pixels of the first group being preselected to undergo subsequent diffusion of a quantization error generated through quantization to a peripheral pixel, the second group comprising pixels located in second preselected pixel positions, the pixels of the second group being quantization to a peripheral pixel;
performing a first quantization process on the pixels belonging to the first group using a threshold matrix composed of a plurality of threshold values;
determining the quantization error generated during the first quantization process;
diffusing the quantization error obtained in the quantization error determining step to at least one non-quantized pixel belonging to the second group which is adjacent to the pixel subjected to the first quantization process;
performing a second quantization process, using a threshold matrix, composed of a plurality of threshold values, on the non-quantized pixel to which an error value is diffused during the quantization error diffusing step; and
outputting a visible image through an image forming apparatus according to halftone image data obtained through the first quantization process and the second quantization process;
wherein the pixels of the first group are distributed at substantially uniform and regular intervals separated by the pixels of the second group.

2. The image processing method as defined in claim 1, wherein the pixels belonging to the first group are distributed at substantially uniform and regular intervals over a plurality of columns and a plurality of rows within a two-dimensional array of the pixels constituting the digital image.

3. The image processing method as defined in claim 1, wherein the threshold matrix has a blue noise characteristic.

4. The image processing method as defined in claim 1, wherein, in the quantization error diffusing step, the quantization error obtained in the quantization error determining step is applied to the non-quantized pixels belonging to the second group in a predetermined ratio.

5. The image processing method as defined in claim 1, wherein the quantization error diffusion step comprises an error distribution control step of controlling at least one of a diffusion destination pixel position of the quantization error obtained in the quantization error determining step, and an error distribution ratio.

6. The image processing method as defined in claim 5, wherein, in the error distribution control step, at least one of the diffusion destination pixel position and the error distribution ratio is determined randomly.

7. The image processing method as defined in claim 1, further comprising the step of determining a representative value of a pixel range constituted by a subject pixel belonging to the first group and peripheral pixels thereof, wherein the representative value obtained in the representative value determining step is used as a value of the subject pixel, quantization is performed on the representative value using a threshold matrix composed of a plurality of threshold values, and a result of the quantization process is used as a quantization result of the subject pixel, whereby the error between the grayscale value of the subject pixel and the quantization result of the subject pixel is determined in the quantization error determining step.

8. The image processing method as defined in claim 1, wherein, when the digital image is a color image comprising a plurality of color components, a size of the threshold matrix is varied according to the color.

9. The image processing method as defined in claim 1, wherein, when the digital image is a color image comprising a plurality of color components, pixel positions of the pixels belonging to the first group are varied according to the color.

10. The image processing method as defined in claim 1, wherein, when the digital image is a color image comprising a plurality of color components, an error diffusion method is varied according to the color.

11. The image processing method as defined in claim 1, wherein, when the digital image is a color image comprising a plurality of color components, a plurality of color signals of a single pixel are gathered together and subjected to a vector quantization process.

12. The image processing method as defined in claim 1, wherein the quantization error obtained in the quantization error determining step is not diffused to a non-quantized pixel belonging to the first group but to the at least one non-quantized pixel belonging to the second group.

13. An image processing apparatus which performs halftoning of a digital image constituted by an array of pixels having grayscale values which correspond to a content of the digital image, the apparatus comprising:

a grouping device which groups the pixels constituting the digital image into a first group and a second group in accordance with a predetermined distribution pattern without regard to the grayscale values of the pixels, the first group comprising pixels located in first preselected pixel positions, the pixels of the first group being preselected to undergo subsequent diffusion of a quantization error generated through quantization to a peripheral pixel, the second group comprising pixels located in second preselected pixel positions, the pixels of the second group being preselected to not undergo subsequent diffusion of any quantization error generated through quantization to a peripheral pixel;

a first quantization device which performs a first quantization process on the pixels belonging to the first group using a threshold matrix composed of a plurality of threshold values;

a quantization error determining device which determines the quantization error generated during the first quantization process;

a quantization error diffusing device which diffuses the quantization error obtained by the quantization error determining device to at least one non-quantized pixel belonging to the second group which is adjacent to the pixel subjected to the first quantization process; and a second quantization device which performs a second quantization process, using a threshold matrix composed of a plurality of threshold values, on the non-quantized pixel to which the quantization error is diffused by the quantization error diffusion device;

wherein the pixels of the first group are distributed at substantially uniform and regular intervals separated by the pixels of the second group.

14. An image forming apparatus, comprising:

the image processing apparatus as defined in claim 13;

a discharge head formed with a nozzle which discharges liquid droplets; and a discharge control device which controls discharge from the discharge head according to halftone image data obtained by the image processing apparatus, wherein an image is formed on a recording medium by the liquid droplets discharged from the nozzles.

15. A computer readable medium having embodied thereon an image processing program for performing, by a computer, halftoning of a digital image constituted by an array of pixels having grayscale values which correspond to a content of the digital image, the image processing program comprising:

a first code segment for grouping the pixels constituting the digital image into a first group and a second group in accordance with a predetermined distribution pattern without regard to the grayscale value of the pixels, the first group comprising pixels located in the first preselected pixel positions, the pixels of the first group being preselected to undergo subsequent diffusion of a quantization error generated through quantization to a peripheral pixel, the second group comprising pixels located in second preselected pixel positions, the pixels of the second group being preselected to not undergo subsequent diffusion of any quantization error generated through quantization to a peripheral pixel;

a second code segment for performing a first quantization process on the pixels belonging to the first group using a threshold matrix composed of a plurality of threshold values;

a third code segment for determining the quantization error generated in the first quantization process;

a fourth code segment for diffusing the determined quantization error to at least one non-quantized pixel belonging to the second group which is adjacent to the pixel subjected to the first quantization process; and a fifth code segment for performing a second quantization process, using a threshold matrix composed of a plurality of threshold values, on the non-quantized pixel to which an error value is diffused during the diffusing of the determined quantization error;

wherein the pixels of the first group are distributed at substantially uniform and regular intervals separated by the pixels of the second group.

16. An image processing method for performing halftoning of a digital image constituted by an array of pixels having grayscale values which correspond to a content of the digital image, the method comprising the steps of:

grouping the pixels constituting the digital image into a first group comprising pixels in pixel positions from which a quantization error generated through quantization is diffused to a peripheral pixel, and a second group comprising pixels in pixel positions from which the quantization error generated through quantization is not diffused to a peripheral pixel;

performing a first quantization process on the pixels belonging to the first group using a threshold matrix;

determining the quantization error generated during the first quantization process;

diffusing the quantization error obtained in the quantization error determining step to at least one non-quantized pixel belonging to the second group which is adjacent to the pixel subjected to the first quantization process;

performing a second quantization process, using a threshold matrix, on the non-quantized pixel to which an error value is diffused during the quantization error diffusing step; and outputting a visible image through an image forming apparatus according to halftone image data obtained through the first quantization process and the second quantization process, wherein:

the quantization error diffusion step comprises an error distribution control step of controlling at least one of a diffusion destination pixel position of the quantization error obtained in the quantization error determining step, and an error distribution ratio; and in the error distribution control step, at least one of the diffusion destination pixel position and the error distribution ratio is controlled in accordance with a grayscale value gradient of the pixels on a periphery of the pixels subjected to the first quantization process.

17. An image processing method for performing halftoning of a digital image constituted by an array of pixels having grayscale values which correspond to a content of the digital image, the method comprising the steps of:

grouping the pixels constituting the digital image into a first group comprising pixels in pixel positions from which a quantization error generated through quantization is diffused to a peripheral pixel, and a second group comprising pixels in pixel positions from which the quantization error generated through quantization is not diffused to a peripheral pixel;

performing a first quantization process on the pixels belonging to the first group using a threshold matrix;

determining the quantization error generated during the first quantization process;

diffusing the quantization error obtained in the quantization error determining step to at least one non-quantized pixel belonging to the second group which is adjacent to the pixel subjected to the first quantization process;

performing a second quantization process, using a threshold matrix, on the non-quantized pixel to which an error value is diffused during the quantization error diffusing step; and outputting a visible image through an image forming apparatus according to halftone image data obtained through the first quantization process and the second quantization process, wherein:

the quantization error diffusion step comprises an error distribution control step of controlling at least one of a diffusion destination pixel position of the quantization error obtained in the quantization error determining step, and an error distribution ratio; and in the error distribution control step, at least one of the diffusion destination pixel position and the error distribution ratio is controlled in accordance with a spatial frequency characteristic of the pixels on a periphery of the pixels subjected to the first quantization process.

* * * * *

UNITED STATES PATENT AND TRADEMARK OFFICE
CERTIFICATE OF CORRECTION

PATENT NO. : 7,701,614 B2  Page 1 of 1
APPLICATION NO. : 11/092787
DATED : April 20, 2010
INVENTOR(S) : Yoshirou Yamazaki It is certified that error appears in the above-identified patent and that said Letters Patent is hereby corrected as shown below:

Title page, change item (54) and col. 1, from "IMAGE PROCESSING METHOD, APPARATUS, AND PROGRAM WITH SELECTIVE ERROR DIFFUSION AMONG A PLURAITY OF PIXEL GROUPS WITHING A DIGITAL IMAGE" to --IMAGE PROCESSING METHOD, APPARATUS, AND PROGRAM WITH SELECTIVE ERROR DIFFUSION AMONG A PLURALITY OF PIXEL GROUPS WITHIN A DIGITAL IMAGE--.

Signed and Sealed this

Third Day of August, 2010

David J. Kappos
*Director of the United States Patent and Trademark Office*